(12) United States Patent
Bendahan

(10) Patent No.: US 10,585,206 B2
(45) Date of Patent: Mar. 10, 2020

(54) METHOD AND SYSTEM FOR A MULTI-VIEW SCANNER

(71) Applicant: Rapiscan Systems, Inc., Torrance, CA (US)

(72) Inventor: Joseph Bendahan, San Jose, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 16/122,781

(22) Filed: Sep. 5, 2018

(65) Prior Publication Data
US 2019/0137651 A1    May 9, 2019

Related U.S. Application Data

(60) Provisional application No. 62/554,929, filed on Sep. 6, 2017.

(51) Int. Cl.
| | | |
|---|---|---|
| *G01N 23/02* | (2006.01) | |
| *G01V 5/00* | (2006.01) | |
| *G01T 1/16* | (2006.01) | |
| *H05G 1/32* | (2006.01) | |

(52) U.S. Cl.
CPC ............. *G01V 5/0016* (2013.01); *G01T 1/16* (2013.01); *G01V 5/0058* (2013.01); *H05G 1/32* (2013.01)

(58) Field of Classification Search
CPC .......... G01V 5/0016; G01T 1/16; H05G 1/32
See application file for complete search history.

(56) References Cited

U.S. PATENT DOCUMENTS

| | | |
|---|---|---|
| 3,239,706 A | 3/1966 | Farrell |
| 4,057,725 A | 11/1977 | Wagner |
| 4,171,254 A | 10/1979 | Koenecke |
| 4,228,353 A | 10/1980 | Johnson |
| 4,274,005 A | 6/1981 | Yamamura |
| 4,420,382 A | 12/1983 | Riedl |
| 4,531,226 A | 7/1985 | Peschmann |

(Continued)

FOREIGN PATENT DOCUMENTS

| | | |
|---|---|---|
| DE | 3840398 A1 | 6/1989 |
| DE | 4432205 C1 | 1/1996 |

(Continued)

OTHER PUBLICATIONS

International Search Report for PCT/GB2004/001729, dated Aug. 12, 2004.

(Continued)

*Primary Examiner* — Kiho Kim
(74) *Attorney, Agent, or Firm* — Novel IP

(57) ABSTRACT

An X-ray inspection system for scanning objects is provided. The system includes a stationary X-ray source made of one or more linear modules positioned around a scanning volume, and defining sparsely positioned multiple stationary X-ray source points from which X-rays can be directed through the scanning volume. An X-ray detector array extends around the scanning volume and is arranged to detect X-rays from the source points which have passed through the scanning volume. A conveyor is arranged to convey the objects through the scanning volume and at least one processor processes the detected X-rays to produce three dimensional images of the items.

18 Claims, 9 Drawing Sheets

(56) References Cited

U.S. PATENT DOCUMENTS

| | | |
|---|---|---|
| 4,672,649 A | 6/1987 | Rutt |
| 4,675,890 A | 6/1987 | Plessis |
| 4,719,645 A | 1/1988 | Yamabe |
| 4,868,856 A | 9/1989 | Frith |
| 4,887,604 A | 12/1989 | Shefer |
| 5,056,124 A | 10/1991 | Kakimoto |
| 5,159,234 A | 10/1992 | Wegmann |
| 5,247,556 A | 9/1993 | Eckert |
| 5,259,014 A | 11/1993 | Brettschneider |
| 5,329,180 A | 7/1994 | Popli |
| 5,467,377 A | 11/1995 | Dawson |
| 5,600,303 A | 2/1997 | Husseiny |
| 5,633,907 A | 5/1997 | Gravelle |
| 5,796,802 A | 8/1998 | Gordon |
| 5,798,972 A | 8/1998 | Lao |
| 5,838,758 A | 11/1998 | Krug |
| 5,841,831 A | 11/1998 | Hell |
| 5,879,807 A | 3/1999 | Inoue |
| 5,943,388 A | 8/1999 | Tuemer |
| 6,088,423 A | 7/2000 | Krug |
| 6,240,157 B1 | 5/2001 | Danielsson |
| 6,324,243 B1 | 11/2001 | Edic |
| 6,417,797 B1 | 7/2002 | Cousins |
| 6,542,580 B1 | 4/2003 | Carver |
| 6,556,651 B1 * | 4/2003 | Thomson ............ A61N 5/1001 378/134 |
| 6,674,838 B1 | 1/2004 | Barrett |
| 7,224,763 B2 | 5/2007 | Naidu |
| 7,349,525 B2 | 3/2008 | Morton |
| 7,372,934 B2 | 5/2008 | De Man |
| 7,440,543 B2 | 10/2008 | Morton |
| 7,505,563 B2 | 3/2009 | Morton |
| 7,512,215 B2 | 3/2009 | Morton |
| 7,564,939 B2 | 7/2009 | Morton |
| 7,636,638 B2 | 12/2009 | Russ |
| 7,664,230 B2 | 2/2010 | Morton |
| 7,684,538 B2 | 3/2010 | Morton |
| 7,724,868 B2 | 5/2010 | Morton |
| 7,728,397 B2 | 6/2010 | Gorrell |
| 7,835,495 B2 | 11/2010 | Harding |
| 7,876,879 B2 | 1/2011 | Morton |
| 7,903,789 B2 | 3/2011 | Morton |
| 7,929,663 B2 | 4/2011 | Morton |
| 7,949,101 B2 | 5/2011 | Morton |
| 8,085,897 B2 | 12/2011 | Morton |
| 8,094,784 B2 | 1/2012 | Morton |
| 8,135,110 B2 | 3/2012 | Morton |
| 8,204,173 B2 | 6/2012 | Betcke |
| 8,223,919 B2 | 7/2012 | Morton |
| 8,243,876 B2 | 8/2012 | Morton |
| 8,331,535 B2 | 12/2012 | Morton |
| 8,451,974 B2 | 5/2013 | Morton |
| 8,552,722 B2 | 10/2013 | Lionheart |
| 8,559,592 B2 | 10/2013 | Betcke |
| 8,625,735 B2 | 1/2014 | Morton |
| 8,804,899 B2 | 8/2014 | Morton |
| 8,824,637 B2 | 9/2014 | Morton |
| 8,837,669 B2 | 9/2014 | Morton |
| 8,885,794 B2 | 11/2014 | Morton |
| 8,958,526 B2 | 2/2015 | Morton |
| 9,001,973 B2 | 4/2015 | Morton |
| 9,020,095 B2 | 4/2015 | Morton |
| 9,046,465 B2 | 6/2015 | Thompson |
| 9,048,061 B2 | 6/2015 | Morton |
| 9,093,245 B2 | 7/2015 | Morton |
| 9,113,839 B2 | 8/2015 | Morton |
| 9,158,030 B2 | 10/2015 | Morton |
| 9,183,647 B2 | 11/2015 | Morton |
| 9,208,988 B2 | 12/2015 | Morton |
| 9,263,225 B2 | 2/2016 | Morton |
| 9,279,901 B2 * | 3/2016 | Akery ............... G01N 23/04 |
| 9,420,677 B2 | 8/2016 | Morton |
| 9,442,082 B2 | 9/2016 | Morton |
| 9,562,866 B2 | 2/2017 | Morton |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,675,306 B2 | 6/2017 | Morton |
| 9,714,920 B2 | 7/2017 | Lionheart |
| 9,726,619 B2 | 8/2017 | Thompson |
| 9,747,705 B2 | 8/2017 | Morton |
| 10,107,783 B2 | 10/2018 | Lionheart |
| 10,175,381 B2 | 1/2019 | Morton |
| 10,295,483 B2 | 5/2019 | Morton |
| 2001/0022830 A1 | 9/2001 | Sommer |
| 2002/0075545 A1 | 6/2002 | Harrison |
| 2002/0094064 A1 | 7/2002 | Zhou |
| 2002/0109844 A1 | 8/2002 | Christel |
| 2003/0091148 A1 | 5/2003 | Bittner |
| 2003/0103212 A1 | 6/2003 | Westphal |
| 2003/0231739 A1 | 12/2003 | Rosner |
| 2004/0012494 A1 | 1/2004 | Lee |
| 2004/0017224 A1 | 1/2004 | Tumer |
| 2004/0022292 A1 | 2/2004 | Morton |
| 2004/0066879 A1 | 4/2004 | Machida |
| 2004/0080315 A1 | 4/2004 | Beevor |
| 2004/0096030 A1 | 5/2004 | Banchieri |
| 2004/0120454 A1 | 6/2004 | Ellenbogen |
| 2005/0031075 A1 | 2/2005 | Hopkins |
| 2005/0089140 A1 | 4/2005 | Mario |
| 2005/0111610 A1 | 5/2005 | De Man |
| 2005/0111619 A1 | 5/2005 | Bijjani |
| 2005/0123092 A1 | 6/2005 | Mistretta |
| 2005/0175151 A1 | 8/2005 | Dunham |
| 2005/0276377 A1 | 12/2005 | Carol |
| 2005/0276382 A1 | 12/2005 | Lesiak |
| 2006/0008047 A1 | 1/2006 | Zhou |
| 2006/0050842 A1 | 3/2006 | Wang |
| 2006/0273237 A1 | 12/2006 | Thompson |
| 2007/0009084 A1 * | 1/2007 | Bhatt ................. G01N 23/046 378/57 |
| 2007/0025512 A1 | 2/2007 | Gertsenshteyn |
| 2007/0122003 A1 | 5/2007 | Dobkin |
| 2007/0183575 A1 | 8/2007 | Lemaitre |
| 2007/0189597 A1 | 8/2007 | Limer |
| 2007/0242802 A1 | 10/2007 | Dafni |
| 2007/0258562 A1 * | 11/2007 | Dinca ................ G01N 23/201 378/62 |
| 2008/0019483 A1 | 1/2008 | Andrews |
| 2008/0043912 A1 | 2/2008 | Harding |
| 2008/0056436 A1 | 3/2008 | Pack |
| 2008/0123803 A1 | 5/2008 | De Man |
| 2008/0130974 A1 | 6/2008 | Xu |
| 2008/0237480 A1 | 10/2008 | Robinson |
| 2009/0003514 A1 | 1/2009 | Edic |
| 2009/0022264 A1 | 1/2009 | Zhou |
| 2009/0034792 A1 | 2/2009 | Kennison |
| 2009/0128557 A1 | 5/2009 | Finlayson |
| 2009/0159451 A1 | 6/2009 | Tomantschger |
| 2009/0185660 A1 | 7/2009 | Zou |
| 2009/0265386 A1 | 10/2009 | March |
| 2009/0274277 A1 | 11/2009 | Morton |
| 2009/0316855 A1 | 12/2009 | Morton |
| 2010/0020934 A1 | 1/2010 | Morton |
| 2010/0025796 A1 | 2/2010 | Dabiran |
| 2010/0061512 A1 * | 3/2010 | Edic .................. G01N 23/20 378/71 |
| 2010/0172476 A1 | 7/2010 | Morton |
| 2010/0329532 A1 | 12/2010 | Masuda |
| 2011/0188725 A1 | 8/2011 | Yu |
| 2012/0219116 A1 | 8/2012 | Thompson |
| 2013/0170611 A1 * | 7/2013 | Beckmann .......... G01N 23/046 378/9 |
| 2013/0251098 A1 | 9/2013 | Morton |
| 2013/0264483 A1 | 10/2013 | Abenaim |
| 2014/0023181 A1 | 1/2014 | Noshi |
| 2014/0211916 A1 | 7/2014 | Morton |
| 2014/0342631 A1 | 11/2014 | Morton |
| 2015/0325010 A1 * | 11/2015 | Bedford ............. G06T 11/003 378/19 |
| 2015/0357148 A1 | 12/2015 | Morton |
| 2016/0003965 A1 * | 1/2016 | Chen ................. G01N 23/203 378/87 |

(56) References Cited

U.S. PATENT DOCUMENTS

| | | | |
|---|---|---|---|
| 2016/0003967 A1* | 1/2016 | Chen | G01V 5/0025 378/87 |
| 2016/0343533 A1 | 11/2016 | Morton | |
| 2016/0372309 A1 | 12/2016 | Steiner | |
| 2017/0161922 A1 | 6/2017 | Morton | |
| 2018/0038988 A1 | 2/2018 | Morton | |
| 2018/0128754 A1 | 5/2018 | Thompson | |
| 2018/0299580 A1 | 10/2018 | Morton | |
| 2019/0178821 A1 | 6/2019 | Morton | |

FOREIGN PATENT DOCUMENTS

| | | |
|---|---|---|
| DE | 4436688 A1 | 4/1996 |
| DE | 19745998 A1 | 3/1999 |
| DE | 19907758 A1 | 8/1999 |
| DE | 10036210 A1 | 11/2001 |
| DE | 10319549 B3 | 12/2004 |
| EP | 0142249 A2 | 5/1985 |
| EP | 0432568 | 6/1991 |
| EP | 0531993 A1 | 3/1993 |
| EP | 0584871 A1 | 3/1994 |
| EP | 0924742 A2 | 6/1999 |
| EP | 0930046 A2 | 7/1999 |
| EP | 1277439 A1 | 1/2003 |
| FR | 2328280 A1 | 5/1977 |
| GB | 1272498 A | 4/1972 |
| GB | 2360405 A | 9/2001 |
| GB | 2423687 A | 8/2006 |
| JP | H0479128 A | 3/1992 |
| JP | H05135721 A | 6/1993 |
| JP | H05182617 A | 7/1993 |
| JP | H05290768 A | 11/1993 |
| JP | H10211196 A | 8/1998 |
| JP | 2001176408 A | 6/2001 |
| JP | 2008166059 A | 7/2008 |
| SU | 1022236 A1 | 6/1983 |
| WO | 9701771 A | 1/1997 |
| WO | 9718462 A1 | 5/1997 |
| WO | 9960387 A2 | 11/1999 |
| WO | 03048808 A | 6/2003 |
| WO | 03051201 A2 | 6/2003 |
| WO | 2004010127 A1 | 1/2004 |
| WO | 2004097456 A | 11/2004 |
| WO | 2004097888 A2 | 11/2004 |
| WO | 2004097889 A2 | 11/2004 |
| WO | 2005050405 A2 | 6/2005 |
| WO | 2006027122 A1 | 3/2006 |
| WO | 2006130630 A2 | 12/2006 |
| WO | 2007068933 A1 | 6/2007 |
| WO | 2008027703 A2 | 3/2008 |
| WO | 2009012453 A1 | 1/2009 |
| WO | 2010007375 A2 | 1/2010 |
| WO | 2010141659 A1 | 12/2010 |

OTHER PUBLICATIONS

International Search Report for PCT/GB2004/001741, dated Mar. 3, 2005.
International Search Report for PCT/GB2004/001731, dated May 27, 2005.
International Search Report for PCT/GB2004/001732, dated Feb. 25, 2005.
International Search Report for PCT/GB2004/1751, dated Mar. 21, 2005.
International Search Report for PCT/GB2004/001747, dated Augsut 10, 2004.
International Search Report for PCT/GB2006/004684, dated May 23, 2007.
International Search Report PCT/GB2008/000116, dated Nov. 17, 2009.
International Search Report for PCT/GB2010/050125, dated Sep. 1, 2010.
STMicroelectronics: "Dual Full-Bridge Driver", Datasheet for L298, 2000, pp. 1-13, XP002593095.
International Search Report, PCT/GB2009/001760, dated Mar. 1, 2010, Rapiscan Systems, Inc.
International Search Report for PCT/GB2009/051178, dated May 11, 2010.
International Search Report for PCT/GB2010/050318, dated Jul. 11, 2011.
International Search Report for PCT/US2010/036183, dated Aug. 20, 2010.
International Search Report for PCT/US2010/036221, dated Aug. 23, 2010.
International Search Report for PCT/US2010/037167, dated Sep. 7, 2010.
International Search Report for PCT/US2010/036179, dated Aug. 30, 2010.
International Search Report for PCT/US2010/041871, dated Oct. 4, 2010.
International Search Report, PCT/US2012/40923, dated Sep. 21, 2012, Rapiscan Systems, Inc.
Bruder et al. "Efficient Extended Field of View (eFOV) Reconstructuion Techniques for Multi-Slice Helical CT", Medical Imaging 2008: Physics of Medical Imaging, edited by Jiang Hsieh, Ehsan Samei, Proc. of SPIE vol. 6913, 69132E, (2008).
International Search Report for PCT/US2011/025777, dated Jul. 26, 2011.
International Search Report for PCT/US18/27872, dated Jul. 23, 2018.
International Search Report for PCT/US2018/063651, dated Feb. 25, 2019.
Keevil, S.V., Lawinski, C.P. and Morton, E.J., 1987, "Measurement of the performance characteristics of anti-scatter grids.", Phys. Med. Biol., 32(3), 397-403.
Morton, E.J., Webb, S., Bateman, J.E., Clarke, L.J. and Shelton, C.G., 1990, "Three-dimensional x-ray micro-tomography for medical and biological applications.", Phys. Med. Biol., 35(7), 805-820.
Morton, E.J., Swindell, W., Lewis, D.G. and Evans, P.M., 1991, "A linear array scintillation-crystal photodiode detector for megavoltage imaging.", Med. Phys., 18(4), 681-691.
Morton, E.J., Lewis, D.G. and Swindell, W., 1988, "A method for the assessment of radiotherapy treatment precision", Brit. J. Radiol., Supplement 22, 25.
Swindell, W., Morton, E.J., Evans, P.M. and Lewis, D.G., 1991, "The design of megavoltage projection imaging systems: some theoretical aspects.", Med. Phys.,18(5), 855-866.
Morton, E.J., Evans, P.M., Ferraro, M., Young, E.F. and Swindell, W., 1991, "A video frame store facility for an external beam radiotherapy treatment simulator.", Brit. J. Radiol., 64, 747-750.
Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.
Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.
Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems.", Brit. J. Radiol., 65, 701-709.
Morton, E.J., Webb, S., Bateman, J.E., Clarke, L.J. and Shelton, C.G., 1989, "The development of 3D x-ray micro-tomography at sub 100Ã?Âµm resolution with medical, industrial and biological applications.", Presentation at IEE colloquium "Medical scanning and imaging techniques of value in non-destructive testing", London, Nov. 3, 1989.
Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.
Gildersleve, J.Q., Swindell, W., Evans, P.M., Morton, E.J., Rawlings, C. and Dearnaley, D.P., 1991, "Verification of patient positioning during radiotherapy using an integrated megavoltage imag-

(56) References Cited

OTHER PUBLICATIONS ing system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification.", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging.", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39, 1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A CAMAC based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

DeAntonis, P., Morton, E.J., T. Menezes, 1996, "Measuring the bulk resistivity of CdZnTe single crystal detectors using a contactless alternating electric field method", Nucl. Inst. Meth., A380, 157-159.

DeAntonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system ", Nucl. Inst. Meth., B143, 253-271.

Patel, D.C. and Morton, E.J., 1998, "Analysis of improved adiabatic pseudo- domino logic family", Electron. Lett., 34(19), 1829-1830.

Kundu, A and Morton, E.J., 1999, "Numerical simulation of argon-methane gas filled proportional counters", Nucl. Inst. Meth., A422, 286-290.

Lugger, R.D., Key, M.J., Morton, E.J. and Gilboy, W.B., 1999, "Energy dispersive X-ray scatter for measurement of oil/water ratios ", Nucl. Inst. Meth., A422, 938-941.

Morton, E.J., Crockett, G.M., Sellin, P.J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Gaunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

Tavora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au-CdZnTe contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

Tavora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.C. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, Sep. 14-17, 1998"\.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photo-electronic investigation of CdZnTe spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

(56) References Cited

OTHER PUBLICATIONS

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O, and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, Jul. 30-Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

\* cited by examiner

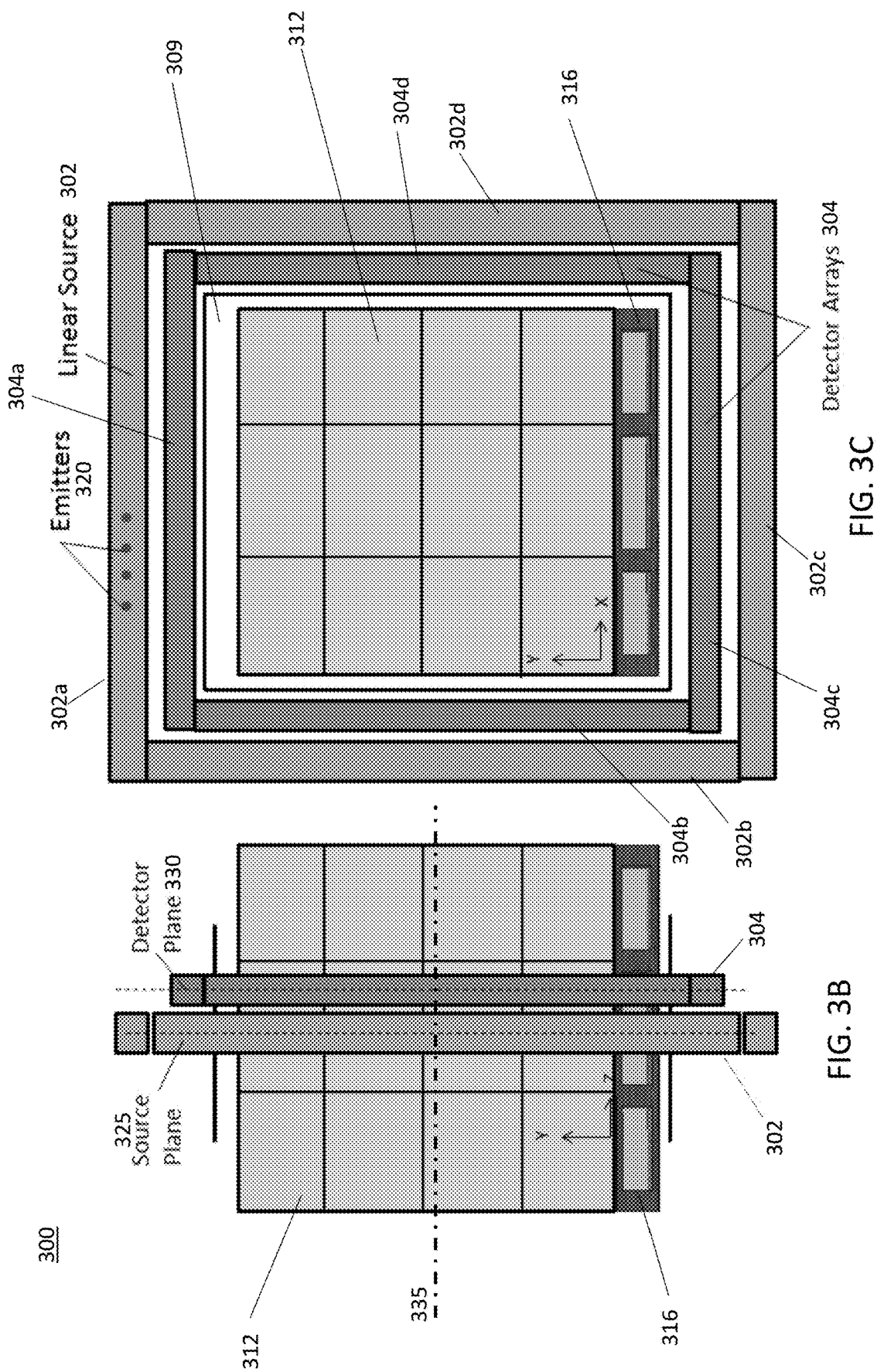

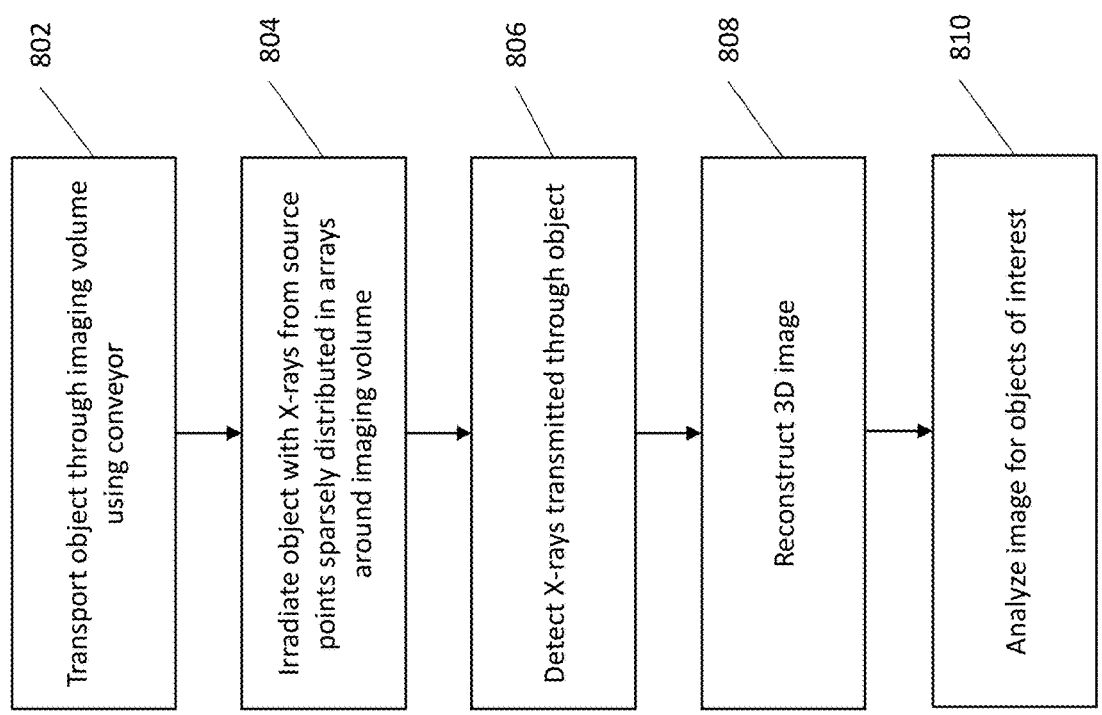

METHOD AND SYSTEM FOR A MULTI-VIEW SCANNER

CROSS-REFERENCE

The present application relies on U.S. Provisional Patent Application No. 62/554,929, entitled "Method and System for a Multi-View Scanner" and filed on Sep. 6, 2017, for priority.

The present application relates to U.S. patent application Ser. No. 13/146,645, filed on Jul. 27, 2011, now issued U.S. Pat. No. 9,093,245, issued on Jul. 28, 2015, which is a 371 national stage application of PCT/GB2010/050125, filed on Jan. 27, 2010 and which, in turn, relies on Great Britain Application No. 0901338.4, filed on Jan. 28, 2009, for priority. Each of the aforementioned applications is hereby incorporated by reference in its entirety.

The present application also relates to U.S. patent application Ser. No. 13/054,066, filed on Jan. 13, 2011, now issued U.S. Pat. No. 9,263,225, issued on Feb. 16, 2016, which is a 371 national stage application of PCT/GB2009/001760, filed on Jul. 15, 2009 and which, in turn, relies on Great Britain Application No. 0812864.7, filed on Jul. 15, 2008, for priority. Each of the aforementioned applications is hereby incorporated by reference in its entirety.

The present application is also related to U.S. patent application Ser. No. 13/063,467, filed on Mar. 11, 2011, now issued U.S. Pat. No. 8,824,637, issued on Sep. 2, 2014, which is a 371 national stage application of PCT/GB2009/051178, filed on Sep. 11, 2009 and which, in turn, relies on Great Britain Application No. 0816823.9, filed on Sep. 13, 2008, for priority. Each of the aforementioned applications is hereby incorporated by reference in its entirety.

The present application is also related to U.S. Pat. No. 9,442,082, issued on Sep. 13, 2016, which is a continuation of U.S. Pat. No. 9,113,839, issued on Aug. 25, 2015. Each of the aforementioned applications is hereby incorporated by reference in its entirety.

The present application is also related to U.S. patent application Ser. No. 13/532,862, filed on Sep. 26, 2013, which is a continuation of U.S. Pat. No. 8,223,919, issued on Jul. 17, 2012, which, in turn, relies on U.S. Provisional Patent Application No. 61/181,068 filed on May 26, 2009, for priority. Each of the aforementioned applications is hereby incorporated by reference in its entirety.

The present application is also related to U.S. patent application Ser. No. 12/788,083, filed on May 26, 2010, now issued as U.S. Pat. No. 8,451,974, issued on May 28, 2013, and which relies on U.S. Provisional Patent Application No. 61/181,070 filed on May 26, 2009, for priority. Each of the aforementioned applications is hereby incorporated by reference in its entirety.

The present application is also related to U.S. patent application Ser. No. 13/086,708, filed on Apr. 14, 2011, now issued as U.S. Pat. No. 8,625,735, issued on Jan. 7, 2014, which is a continuation of U.S. Pat. No. 7,949,101, filed on Jun. 16, 2009. Each of the aforementioned applications is hereby incorporated by reference in its entirety.

The present application is related to U.S. patent application Ser. No. 12/792,931, filed on Jun. 3, 2010, now issued as U.S. Pat. No. 8,331,535, issued on Dec. 11, 2012, and which relies on U.S. Provisional Patent Application No. 61/183,591 filed on Jun. 3, 2009, for priority. Each of the aforementioned applications is hereby incorporated by reference in its entirety.

The present application is also related to U.S. patent application Ser. No. 13/346,705, filed on Jan. 9, 2012, now issued as U.S. Pat. No. 8,559,592, issued on Oct. 15, 2013, which is a continuation of U.S. patent Ser. No. 12/835,682, filed on Jul. 13, 2010, now issued as U.S. Pat. No. 8,204,173, issued on Jun. 19, 2012, and which relies on U.S. Provisional Patent Application No. 61/225,257 filed on Jul. 14, 2009, for priority. Each of the aforementioned applications is hereby incorporated by reference in its entirety.

The present application is also related to U.S. patent application Ser. No. 12/787,878, filed on May 26, 2010, now issued as U.S. Pat. No. 8,804,899, issued on Aug. 12, 2014, and which relies on U.S. Provisional Patent Application No. 61/181,077 filed on May 26, 2009, for priority, which is:

1. A continuation-in-part of U.S. patent application Ser. No. 12/485,897, filed on Jun. 16, 2009, which is a continuation of U.S. patent application Ser. No. 10/554,656, filed on Oct. 25, 2005, now issued as U.S. Pat. No. 7,564,939, issued on Jul. 21, 2009, which is a 371 national stage application of PCT/GB2004/001729, filed on Apr. 23, 2004 and which, in turn, relies on Great Britain Application No. 0309387.9, filed on Apr. 25, 2003, for priority;
2. A continuation-in-part of U.S. Pat. No. 7,903,789, filed on Feb. 16, 2009, which is a continuation of U.S. Pat. No. 7,512,215, filed on Oct. 25, 2005, which is a 371 national stage application of PCT/GB2004/001741, filed on Apr. 23, 2004 and which, in turn, relies on Great Britain Application Number 0309383.8, filed on Apr. 25, 2003, for priority;
3. A continuation-in-part of U.S. Pat. No. 7,664,230, filed on Oct. 25, 2005, which is a 371 national stage application of PCT/GB2004/001731, filed on Apr. 23, 2004 and which, in turn, relies on Great Britain Patent Application Number 0309371.3, filed on Apr. 25, 2003, for priority;
4. A continuation-in-part of U.S. patent application Ser. No. 12/033,035, filed on Feb. 19, 2008, now issued as U.S. Pat. No. 7,505,563, issued on Mar. 17, 2009, which is a continuation of U.S. patent application Ser. No. 10/554,569, filed on Oct. 25, 2005, now issued as U.S. Pat. No. 7,349,525, issued on Mar. 25, 2008, which is a 371 national stage filing of PCT/GB2004/001732, filed on Apr. 23, 2004 and which, in turn, relies on Great Britain Patent Application Number 0309374.7, filed on Apr. 25, 2003, for priority;
5. A continuation-in-part of U.S. Pat. No. 7,929,663, filed on Apr. 12, 2010, which is a continuation of U.S. patent application Ser. No. 12/211,219, filed on Sep. 16, 2008, now issued as U.S. Pat. No. 7,724,868, issued on May 25, 2010, which is a continuation of U.S. patent Ser. No. 10/554,655, filed on Oct. 25, 2005, now issued as U.S. Pat. No. 7,440,543, issued on Oct. 21, 2008, which is a 371 national stage application of PCT/GB2004/001751, filed on Apr. 23, 2004, and which, in turn, relies on Great Britain Patent Application Number 0309385.3, filed on Apr. 25, 2003, for priority;
6. A continuation-in-part of U.S. Pat. No. 8,085,897, filed on Jan. 29, 2010, which is a continuation of U.S. patent application Ser. No. 10/554,570, filed on Oct. 25, 2005, now issued as U.S. Pat. No. 7,684,538, issued on Mar. 23, 2010, which is a 371 national stage application of PCT/GB2004/001747, filed on Apr. 23, 2004, and which, in turn, relies on Great Britain Patent Application Number 0309379.6, filed on Apr. 25, 2003, for priority;
7. A continuation-in-part U.S. patent application Ser. No. 12/142,005, filed on Jun. 19, 2008, now issued as U.S. Pat. No. 8,135,110, issued on Mar. 13, 20112, which is a continuation of U.S. patent application Ser. No. 12/097,422, filed on Jun. 13, 2008, now issued as U.S. Pat. No. 7,876,879, issued on Jan. 25, 2011, which is a 371 national stage application of PCT/GB2006/004684, filed on Dec. 15, 2006, which, in turn, relies on Great Britain Patent Application Number 0525593.0, filed on Dec. 16, 2005, for priority;

8. A continuation-in-part of U.S. patent application Ser. No. 13/313,854, filed on Dec. 7, 2011, now issued as U.S. Pat. No. 9,001,973, issued on Apr. 7, 2015, which is a continuation of U.S. patent application Ser. No. 12/478,757, filed on Jun. 4, 2009, now issued as U.S. Pat. No. 8,094,784, issued on Jan. 10, 2012, which is a continuation-in-part of U.S. patent application Ser. No. 12/364,067, filed on Feb. 2, 2009, which is a continuation of U.S. patent application Ser. No. 12/033,035, filed on Feb. 19, 2008, now issued as U.S. Pat. No. 7,505,563, issued on Mar. 17, 2009, which is a continuation of U.S. patent application Ser. No. 10/554,569, filed on Oct. 25, 2005, now issued as U.S. Pat. No. 7,349,525, issued on Mar. 25, 2008, which is a 371 national stage filing of PCT/GB2004/001732, filed on Apr. 23, 2004 and which, in turn, relies on Great Britain Patent Application Number 0309374.7, filed on Apr. 25, 2003, for priority; and 9. A continuation-in part of U.S. patent application Ser. No. 12/712,476, filed on Feb. 25, 2010, now issued as U.S. Pat. No. 8,243,876, issued on Aug. 14, 2012, which relies on U.S. Provisional Patent Application No. 61/155,572 filed on Feb. 26, 2009 and Great Britain Patent Application No. 0903198.0 filed on Feb. 25, 2009, for priority.

Each of the aforementioned PCT, foreign, and U.S. applications, and any applications related thereto, is herein incorporated by reference in their entirety.

FIELD

The present specification is directed to multi-view, high-energy scanners and, more specifically, methods and systems of cost-effectively producing high quality scan images of skids for improving density and atomic number estimations of cargo contents for enhanced detection of contraband and other materials of interest.

BACKGROUND

The United States imports an estimated 7 million tons of cargo transported by air with the annual amount of air freight continually growing. Air transportation constitutes the highest value cargo of any method of transportation, and its disruption, such as through terrorist attacks, would have very negative effects on the global economy. One potential risk is that terrorists may exploit air-cargo vulnerabilities to introduce an explosive device in cargo transported aboard a passenger aircraft or smuggle a weapon of mass destruction (WMD) within cargo transported on either passenger or cargo aircraft. Therefore, it has been mandated that all cargo transported on passenger aircraft be screened for explosives. In addition, there is a need to detect contraband, narcotics, currency, chemical and nuclear weapons, or any other material that could be of interest and that may also undergo cargo-manifest verification.

Detection of contraband with both high detection rates and low false alarm rates is a daunting task, as illegal, banned, or otherwise regulated materials often have similar physical characteristics as benign cargo. The percentage of cargo to be inspected is increasing and, because of the currently manually intensive nature of inspections, so must the number of operators. Therefore, there is a need to provide an automatic detection system to reduce the number of operators, or at least provide assistance tools that help operators improve their throughput by scrutinizing the cargo images more efficiently, thereby increasing detection and analysis speed.

Current explosives detection systems used in air-cargo facilities include, but are not limited to, break-bulk and X-ray pallet scanners, Explosives Trace Detectors (ETDs), canine inspection, and manual inspection. These methods suffer from one or more deficiencies such as low detection performance, low throughput to meet peak demand, and large staffing demands. While EDSs used for inspecting checked luggage provide high explosive detection performance, they have a small tunnel size suitable only for break-bulk cargo, requiring unpacking and reassembly of larger pallets, which results in slow throughput and larger staffing. In addition, these systems are expensive and are not easily afforded by private screeners. ETDs are slow, and the detection probability depends on the explosives packing method and the system sampling method. Canine inspection has the disadvantages of the significant effort of maintaining a canine operation and the cost of ownership. Manual inspection is time consuming and has low detection performance. Thus, there is a need for cost-effective inspection systems with improved detection to scan large objects.

Both standard and advanced X-ray scanner systems have difficulty detecting contraband in break-bulk cargo. This difficulty is exacerbated when inspecting larger and/or cluttered pallets and cargo containers. Large cargo containers require a relatively higher energy to be efficiently and effectively scanned for items of interest. There are some systems that produce high-resolution, dual-energy images and penetrate the majority of containers. However, these systems take approximately one hour to scan a container, thus requiring a large infrastructure which tends to be expensive for wide deployment. Therefore, at the higher energy required these approaches are not suitable for implementation due to cost, size, and complexity.

Further, while Computed Tomography (CT)-based systems have been shown to be more suitable for the difficult task of detecting aviation-threat explosives in luggage and, more recently, in larger objects, existing high-energy CT systems for large objects are configured horizontally (horizontal gantry) with the object rotating about its axis. In one case, the source and detectors move vertically, and in the other case, the object moves vertically while the source and detectors are stationary. In both cases, the length of the scanned objects is limited by the system size and the configuration prevents scaling the system up to long objects such as large cargo containers and large skids.

A trade-off between CT and dual-view radiography is a multi-view system, illustrated in FIG. 1, for example. The traditional approach is based on a few commercial X-ray sources 102 (for example, 2-3 sources) coupled with a few detector arrays 104 (for example, 2-5 detector arrays) to produce multiple views of an object 106 being scanned as it is conveyed through the system.

Another system based on these principles has been scaled up to scan palletized cargo. Additional views are obtained employing a rotating stage with a similar concept to that shown in FIG. 1. In this approach, the cargo is rotated by the desired angle (for example, 45°) and rescanned to generate additional views to improve the quality of the 3D images. The rotating stage reduces the need for additional sources and detectors. The disadvantages include lower throughput as the number of views increases, high cost, large footprints, and low performance since the number of views is typically too few for an acceptably enhanced 3D image quality that is sufficient for high detection performance.

Therefore, there is a need for detection systems which are cost-effective, have a high throughput, and are sufficiently compact to allow improved detection while scanning large objects such as cargo positioned on skids.

SUMMARY

In some embodiments, the present specification discloses an inspection system to scan an object, comprising: a conveyor to transport the object through a scanning volume for inspection; a first linear X-ray source module comprising a first plurality of stationary source points configured to emit X-rays and serially positioned along a length of the first linear X-ray source module; a second linear X-ray source module comprising a second plurality of stationary source points configured to emit X-rays and serially positioned along a length of the second linear X-ray source module, wherein the second linear X-ray source module is perpendicularly positioned relative to the first linear X-ray source module; a third linear X-ray source module comprising a third plurality of stationary source points configured to emit X-rays and serially positioned along a length of the third linear X-ray source module, wherein the third linear X-ray source module is perpendicularly positioned relative to the first linear X-ray source module and is positioned in parallel to the second linear X-ray source module; a fourth linear X-ray source module comprising a fourth plurality of stationary source points configured to emit X-rays and serially positioned along a length of the fourth linear X-ray source module, wherein the fourth linear X-ray source module is perpendicularly positioned relative to the second and third linear X-ray source modules and is positioned in parallel to the first linear X-ray source module and wherein the first, second, third, and fourth linear X-ray source modules define the scanning volume; a detector array having a plurality of detector modules arranged around the scanning volume to detect X-rays transmitted through the scanning volume and generate scan data; a controller configured to activate and deactivate each of the source points of the first, second, third, and fourth plurality of stationary source points in a predefined sequence; and a processor for processing the scan data to reconstruct three dimensional images of the object.

Optionally, a length of each detector module is in a range from 1 to 2 meters.

Optionally, a number of source points in the first plurality of stationary source points, the second plurality of stationary source points, the third plurality of stationary points, and the fourth plurality of stationary source points is at least two.

Optionally, a number of source points in the first plurality of stationary source points, the second plurality of stationary source points, the third plurality of stationary points, and the fourth plurality of stationary source points is in a range of 2 to 100 and wherein each of said source points in each of the first, second, third, and four plurality of stationary source points is positioned equidistant from each other.

Optionally, the detector array comprises four detector modules, wherein each of the four detector modules is positioned between one of the first, second, third, and fourth linear X-ray source modules and the object, and wherein a plane of the detector array is offset from a plane of the first, second, third, and fourth plurality of stationary source points in a direction of conveyance of the object.

Optionally, the plane of the detector array is offset from the plane of the first, second, third and fourth plurality of stationary source points by a distance in a range of 2 to 3 cm.

Optionally, the detector array is at least one of a linear array comprising a 1 dimensional array or a 2 dimensional array.

Optionally, the detector array is at least one of a single energy detector array, a dual energy detector array, or a multi-energy detector array.

Optionally, the system further comprises a voltage supply, wherein the voltage supply is configured to provide voltage in a range of 200 kV to 800 kV to the first, second, third, and fourth plurality of stationary source points.

Optionally, a linear dimension of a cross-section of the scanning volume is between 1 to 2 meters.

Optionally, the controller is configured to activate each source point of the first, second, third and fourth plurality of stationary source points for a dwell time of 100 µs to 500 µs per scan projection.

Optionally, each source point of the first, second, third and fourth plurality of stationary source points are connected to a single high-voltage power supply in a daisy chain configuration.

Optionally, each source point of the first, second, third and fourth plurality of stationary source points has a field of view and wherein the field of view ranges from 60 degrees to 120 degrees.

Optionally, each source point of the first, second, third and fourth plurality of stationary source points has a field of view and wherein the field of view is non-uniform across a length of the first, second, third, or fourth linear X-ray source module.

Optionally, each source point of the first, second, third and fourth plurality of stationary source points has a field of view and wherein the field of view is smaller for source points closer to an end of the first, second, third, or fourth linear X-ray source module compared to source points closer to a center of the first, second, third, or fourth linear X-ray source module.

In some embodiments, the present specification discloses a method of scanning an object using an X-ray scanner having a scanning volume, comprising: transporting the object through the scanning volume using a conveyor; irradiating the object with X-rays generated by a stationary multi-focus X-ray source, wherein the stationary multi-focus X-ray source comprises a plurality of stationary X-ray source points sparsely arranged in a non-circular configuration around the scanning volume, and wherein the source points have a field of view ranging from 60 degrees to 120 degrees; detecting X-rays transmitted through the object using a detector array having a plurality of detector modules arranged in a non-circular configuration around the scanning volume; and processing the transmission X-ray data of the object being inspected to reconstruct tomographic images of the object.

Optionally, the non-circular configuration of the plurality of stationary X-ray source points and the plurality of detector modules is rectangular.

Optionally, a number of the plurality of stationary X-ray source points is at least two.

Optionally, the plurality of stationary X-ray source points are arranged in four linear source modules forming a rectangular configuration around the scanning volume.

Optionally, the plurality of stationary X-ray source points are arranged in three linear source modules forming a U configuration around the scanning volume.

Optionally, the detector array is a linear array comprising at least one of a 1 dimensional array or a 2 dimensional array.

Optionally, the detector array is a linear array comprising at least one of a single energy detector array, a dual energy detector array, or a multi-energy detector array.

Optionally, the object is transported by the conveyor moving at a speed ranging from 0.1 m/s to 0.5 m/s.

Optionally, the method further comprises activating each of the plurality of stationary X-ray source points for a dwell time ranging from 50 µs to 500 µs per scan projection.

In some embodiments, the present specification discloses an inspection system to scan an object, comprising: a conveyor to transport the object through a scanning volume for inspection; a multi-focus X-ray source comprising a plurality of X-ray source points sparsely arranged in one or more linear source modules around the scanning volume, wherein a beam angle of X-rays formed by each of the plurality of X-ray source points relative to the object for inspection varies across the plurality of X-ray source points; a detector array positioned between the multi-focus X-ray source and the scanning volume, wherein the detector array comprises a plurality of detector modules arranged in a non-circular geometry around the scanning volume to detect X-rays transmitted through the object during scanning and is configured to generate scan data; and a processor configured to analyze the scan data and reconstruct image data of the object being inspected.

Optionally, the plurality of X-ray source points are arranged in four linear source modules forming a rectangular geometry around the scanning volume.

Optionally, the plurality of X-ray source points are arranged in three linear source modules forming a U geometry around the scanning volume.

Optionally, a first plane of the X-ray source and a second plane of the detector array are offset with respect to one another in a direction substantially parallel to a direction of movement of the object.

In some embodiments, the present specification discloses an inspection system to scan an object, comprising: a conveyor to transport the object through a scanning volume for inspection; a linear X-ray source module comprising a plurality of stationary source points configured to emit X-rays and serially positioned along a length of the linear X-ray source module, wherein the X-ray source module is positioned on a first side of the scanning volume; a detector array having at least three detector modules arranged along a second, a third, and a fourth sides of the scanning volume, to detect X-rays transmitted through the scanning volume and generate scan data, wherein the linear X-ray source module and the detector array lie on a single plane; a controller configured to activate and deactivate each of the source points of the plurality of stationary source points in a predefined sequence; and a processor for processing the scan data to reconstruct three dimensional images of the object.

In some embodiments, the present specification discloses an inspection system to scan an object, comprising: a conveyor to transport the object through a scanning volume for inspection; an X-ray source assembly comprising two linear X-ray source modules positioned on first and second adjacent sides of the scanning volume to form a substantially right angle between the two source modules, wherein each linear source module comprises a first plurality and a second plurality of stationary source points configured to emit X-rays and serially positioned along a length of each linear X-ray source module; a detector array having a detector assembly of two detector modules positioned on third and fourth adjacent sides of the scanning volume to form a substantially right angle between the two detector modules, such that the form of the first detector assembly inversely corresponds to the form of the source assembly, and wherein said source assembly and said detector assembly lie on a single plane; a controller configured to activate and deactivate each of the source points of the first and second plurality of stationary source points in a predefined sequence; and a processor for processing the scan data to reconstruct three dimensional images of the object.

In some embodiments, the present specification discloses an inspection system to scan an object, comprising: a conveyor to transport the object through a scanning volume for inspection; a plurality of X-ray source points arranged in: a first X-ray source assembly comprising two linear X-ray source modules positioned on first and second adjacent sides of the scanning volume to form a substantially right angle between the two source modules, wherein the two linear X-ray source modules comprise a first plurality and a second plurality of stationary source points respectively, configured to emit X-rays and serially positioned along a length of the linear X-ray source module; and a second X-ray source assembly comprising two linear X-ray source modules positioned on first and fourth adjacent sides of the scanning volume to form a substantially right angle between the two source modules, wherein the two linear X-ray source modules comprise a third plurality and a fourth plurality of stationary source points respectively, configured to emit X-rays and serially positioned along a length of the linear X-ray source module; a detector array having: a first detector assembly of two detector modules positioned on third and fourth adjacent sides of the scanning volume to form a substantially right angle between the two detector modules, such that the form of the first detector assembly inversely corresponds to the form of the first source assembly, and wherein said first source assembly and said first detector assembly lie on a first plane; a second detector assembly of two detector modules positioned on second and third adjacent sides of the scanning volume to form a substantially right angle between the two detector modules, such that the form of the second detector assembly inversely corresponds to the form of the second source assembly, and wherein said second source assembly and said second detector assembly lie on a second plane, and wherein said first plane is offset from said second plane in a direction of conveyance of the object; a controller configured to activate and deactivate each of the source points of the first, second, third, and fourth plurality of stationary source points in a predefined sequence; and a processor for processing the scan data to reconstruct three dimensional images of the object.

In some embodiments, the present specification discloses an inspection system to scan an object, comprising: a conveyor to transport the object through a scanning volume for inspection; a first X-ray source assembly comprising two linear X-ray source modules positioned on first and second adjacent sides of the scanning volume to form a substantially right angle between the two source modules, wherein each linear source module comprises a first plurality and a second plurality of stationary source points configured to emit X-rays and serially positioned along a length of the linear X-ray source module; and a second X-ray source assembly comprising two linear X-ray source modules positioned on first and fourth adjacent sides of the scanning volume to form a substantially right angle between the two source modules, wherein each linear source module comprises a third plurality and fourth plurality of stationary source points configured to emit X-rays and serially positioned along a length of the linear X-ray source module; a detector array having: a first detector assembly of two detector modules positioned on third and fourth adjacent sides of the scanning volume to form a substantially right angle between the two detector modules, such that the form of the first detector assembly inversely corresponds to the form of the first source assembly, and wherein said first source assembly and said first detector assembly lie on a first plane; a second detector assembly of two detector modules positioned on second and third adjacent sides of the scanning volume to form a substantially right angle between the two detector modules, such that the form of the second detector assembly inversely corresponds to the form of the second source assembly, and wherein said second source assembly and said second detector assembly lie on a second plane, and wherein said first plane is offset from said second plane in a direction of conveyance of the object; a controller configured to activate and deactivate each of the source points of the first, second, third, and fourth plurality of stationary source points in a predefined sequence; and a processor for processing the scan data to reconstruct three dimensional images of the object.

In some embodiments, the present specification discloses an inspection system to scan an object, comprising: a conveyor to transport the object through a scanning volume for inspection; a multi-focus X-ray source having a plurality of X-ray source points sparsely arranged in source modules around the scanning volume, wherein the source points are turned on and off in a predefined sequence; a detector array having a plurality of detector modules arranged around the scanning volume to detect X-rays transmitted through the object during scanning; and a processor for processing the transmission data of the object being inspected to reconstruct tomographic images of the object.

Optionally, the source modules are linear.

Optionally, the detector modules are linear.

Optionally, the plurality of X-ray source points are arranged in four linear source modules forming a rectangular geometry around the scanning volume.

Optionally, the detector array has four detector modules positioned between said four linear source modules and the object, and wherein a first plane of the detector array is offset from a second plane of the X-ray source in a direction of conveyance of the object.

Optionally, the plurality of X-ray source points are arranged in three linear source modules enclosing the scanning volume in the form of a "U" shape.

Optionally, the detector array has three detector modules positioned between said three linear source modules and the object, wherein the three detector modules enclose the scanning volume in the form of an inverted "U" shape, and wherein a first plane of the detector array is offset from a second plane of the X-ray source in a direction of conveyance of the object.

Optionally, the plurality of X-ray source points are arranged in a single source module positioned on a first side of the scanning volume, and wherein the detector array has three detector modules positioned on second, third and fourth sides of the scanning volume, the three detector modules forming a first detector assembly, and wherein said source module and said first detector assembly lie on a single plane.

Optionally, the plurality of X-ray source points are arranged in a first source assembly of two source modules positioned on first and second adjacent sides of the scanning volume to form a substantially right angle between the two source modules, wherein the detector array has a first detector assembly of two detector modules positioned on third and fourth adjacent sides of the scanning volume to form a substantially right angle between the two detector modules, such that the form of the first detector assembly inversely corresponds to the form of the first source assembly, and wherein said first source assembly and said first detector assembly lie on a first plane.

Optionally, the plurality of X-ray source points are arranged in a second source assembly of two source modules positioned on first and fourth adjacent sides of the scanning volume to form a substantially right angle between the two source modules of the second source assembly, wherein the detector array has a second detector assembly of two detector modules positioned on second and third adjacent sides of the scanning volume to form a substantially right angle between the two detector modules of the second detector assembly, wherein said second source assembly and said second detector assembly lie on a second plane, and wherein said first plane is offset from said second plane in a direction of conveyance of the object.

Optionally, the detector array is a linear array comprising one of a 1-dimensional array and a 2-dimensional array.

Optionally, the detector array is one of a single energy detector array, a dual energy detector array, and a multi-energy detector array.

Optionally, the source voltage is from 200 kV to 800 kV.

Optionally, a linear dimension of a cross-section of the scanning volume is between 0.5 meters to 5 meters, or any numerical increment therein, and more preferably 1 to 2 meters.

Optionally, each of the X-ray source points has a dwell time ranging from 10 us to 5000 μs per scan projection, or any numerical increment therein, and more preferably 100 μs to 500 μs per scan projection.

Optionally, the algorithm to reconstruct the images is iterative.

Optionally, said processor is programmed to analyze the images for automatic or operator assisted detection of items of interest.

Optionally, the source modules are connected to a single high-voltage power supply in a daisy chain.

In some embodiments, the present specification discloses a method of scanning an object using an X-ray scanner having a scanning volume, comprising: transporting the object through the scanning volume using a conveyor; irradiating the object with X-rays generated by a multi-focus X-ray source, wherein the X-ray source has a plurality of X-ray source points sparsely arranged around the scanning volume; detecting X-rays transmitted through the object using a detector array having a plurality of detector modules arranged in a non-circular geometry around the scanning volume; and a processor for processing the transmission scan data of the object being inspected to reconstruct tomographic images of the object.

Optionally, the non-circular geometry of the plurality of detector modules is rectangular.

Optionally, a number of the plurality of X-ray source points is at least two.

Optionally, the plurality of X-ray source points are arranged in four linear source modules forming a rectangular geometry around the scanning volume.

Optionally, the plurality of X-ray source points are arranged in three linear source modules enclosing the scanning volume.

Optionally, the detector array is a linear array comprising one of a 1-dimensional array and a 2-dimensional array.

Optionally, the detector array is a linear array comprising one of a single energy detector array, a dual energy detector array, and a multi-energy detector array.

Optionally, the object is transported by the conveyor moving at a speed ranging from 0.1 m/s to 0.5 m/s.

Optionally, each of the X-ray source points has a dwell time ranging from 50 µs to 500 µs per scan projection.

In some embodiments, the present specification discloses an inspection system to scan an object, comprising: a conveyor to transport the object through a scanning volume for inspection; a multi-focus X-ray source; a plurality of X-ray source points sparsely arranged, in the multi-focus source, in one or more linear source modules around the scanning volume, wherein a beam angle of X-rays formed by each of the plurality of X-ray source points relative to the object for inspection, varies across the plurality of X-ray source points such that when the plurality of X-ray source points are operational, the beams are spread over a substantial portion of the scanning volume; a detector array positioned between the X-ray source and the scanning volume, wherein the detector array has a plurality of detector modules arranged in a non-circular geometry around the scanning volume to detect X-rays transmitted through the object during scanning; and a processor for analyzing sinogram data and reconstructed image data of the object being inspected to identify threat.

Optionally, the plurality of X-ray source points are arranged in four linear source modules forming a rectangular geometry around the scanning volume.

Optionally, the plurality of X-ray source points are arranged in three linear source modules enclosing the scanning volume.

Optionally, a first plane of the X-ray source and a second plane of the detector array are offset with respect to one another, by a distance, in a direction substantially parallel to a direction of transport of the object.

The system or method may further comprise, in any combination, any one or more features of the embodiments of the present specification which shall now be described in greater depth by way of example only in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 3B is a side perspective view of the scanning unit of FIG. 3A;

FIG. 3C is a front perspective view of the scanning unit of FIG. 3A;

FIG. 8 is a flow chart illustrating exemplary steps of a method of scanning an object using a multi-view X-ray scanner, in accordance with some embodiments of the present specification.

DETAILED DESCRIPTION

Figure 1:
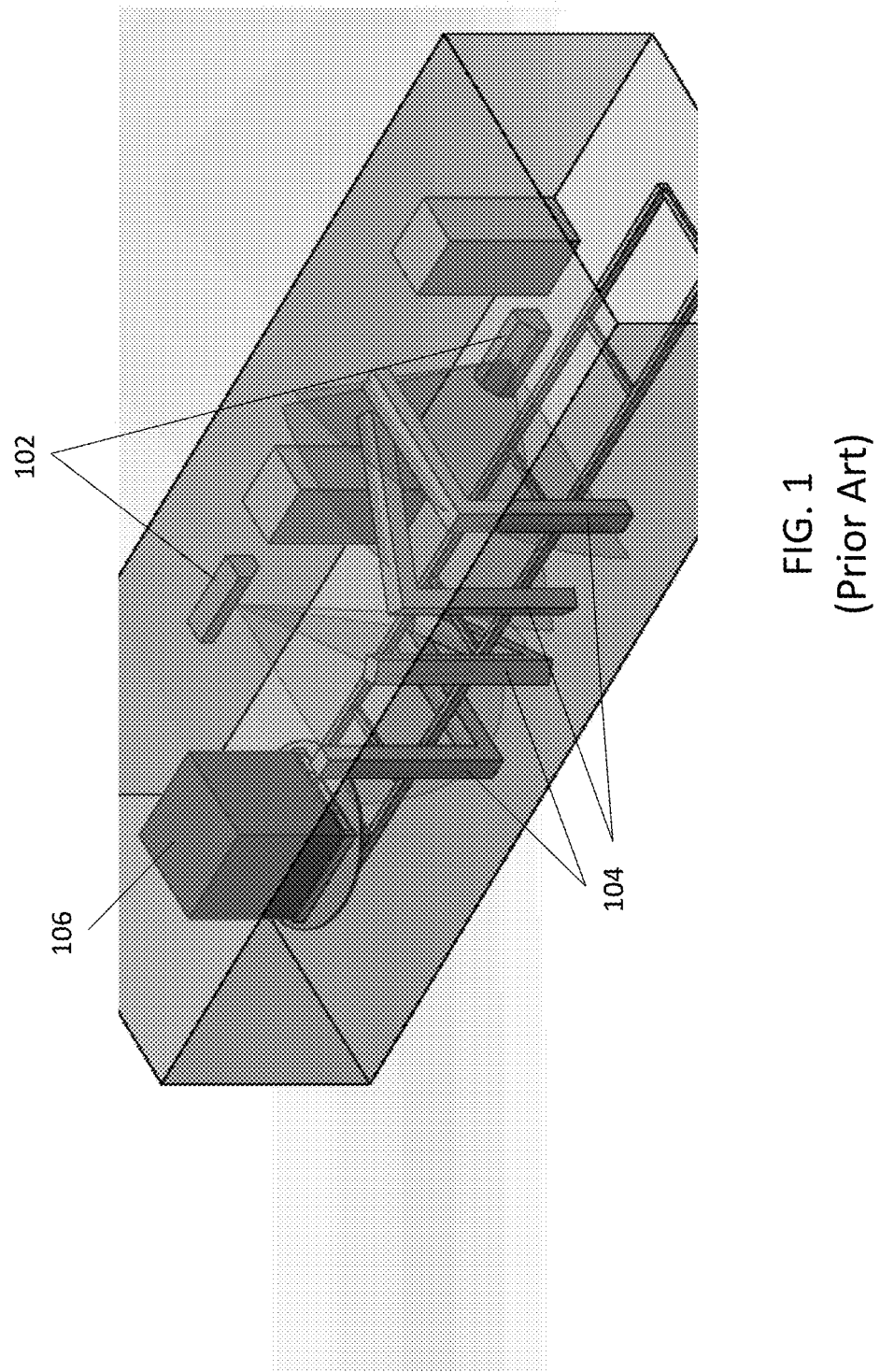
FIG. 1 shows a conventional multi-view pallet scanner system.

Current air-cargo scanning is both time and labor intensive. Although skids may fit through single or dual view X-ray scanners, skids are broken into boxes and run through the scanner separately due to lack of penetration or to prevent the generation of cluttered images that make the visual or operator assisted detection of explosives and other contraband difficult. Typically, two people are required to scan a skid, as one person removes the shrink-wrap from the skid and places each box or skid on the conveyor, a second person takes the scanned box and assembles it at the other side onto another skid, and subsequently shrink-wraps the reassembled skid or palletized cargo. Depending on the size and number of individual boxes on the skid, this process takes between 2-5 minutes. A similar process is required for both single and dual-view X-ray pallet scanners. Although the pallet may fit through the tunnel, the pallet is broken into boxes and run through the scanner separately to prevent the generation of cluttered images that make the (visual or operator assisted) detection of explosives and other contraband difficult.

Embodiments of the present specification provide methods and systems that scan fully loaded pallets, skids or Unit Load Devices (ULDs) (collectively referred to as a pallet or skid) without the need to unpack and scan the smaller items individually and thus, reassemble the pallet, skid or ULD. A pallet or skid is a flat transport structure, which supports goods in a stable fashion while being lifted by a forklift, a pallet jack, a front loader, a jacking device, a crane, or other transport mechanism. A pallet is the structural foundation of a unit load which allows handling and storage efficiencies. Exemplary pallets comprise a series of wooden boards configured in parallel, forming a planar surface, and range in sizes from a width of 48 inches by a length of 40 inches, where the load bearing capacity is in a range of 2.7 long tons and is typically used in North America, to 39.3 inches (width) by 47.24 inches (length), 45.9 inches (width) by 45.9 inches (length), 42 inches (width) by 42 inches (length), 43.3 inches (width) by 43.30 inches (length) or 31.50 inches (width) by 47.2.4 inches (length) used in other areas of the world.

A ULD is a pallet, skid, or container used to load luggage, freight, and/or mail on aircraft. It allows a large quantity of cargo to be bundled into a single unit. Specific ULDs are designed to be fit, and be compatible with, specific aircraft. For example, ULDs referred to as LD3, LD6, or LD11 are configured to fit the cargo dimensions of one or more of a 787 aircraft, 777 aircraft, 747 aircraft, MD-11 aircraft, 11-86 aircraft, 11-96 aircraft, L-101 aircraft, and Airbus aircraft. The ULDs referred to as LD2 or LD8 are configured to fit the cargo dimensions of a 767 aircraft. The ULDs referred to as LD1 or LD3 are configured to fit the cargo dimensions of a 747 aircraft. The internal volumes of the ULDs range from 100 ft3 to 600 ft3 or, more specifically, 124 ft3 to 560 ft.3

In addition to being able to scan fully loaded pallets without the need to unpack and scan the smaller items individually and thus, reassemble the pallet, large crates that cannot be broken into smaller parts can be scanned. These capabilities reduce the total time to inspect cargo and reduce the staffing requirements, resulting in fewer delays and lower operational costs. The various embodiments that will be described in greater detail below are capable of scanning a pallet without disassembling its contents, within a time frame in a range of between 4 and 20 seconds, and, in some embodiments in about 10 seconds. For example, in some embodiments, a system having a conveyor speed in a range of 0.1 m/sec to 0.5 m/sec would be configured to scan a 2 m wide object within 4 to 20 seconds. Thus, the embodiments of the present specification allow for fast throughput, which is significant for cargo facilities that deal with peak demand to ensure timely delivery, in particular for perishable items.

In addition, the systems of the present specification are advantageous because, among other advantages, a skid will fit through the inspection tunnel or volume and the system will allow for the acquisition of CT-like density and atomic number (Z) and for the production of 3D images of the pallet with little clutter superposition.

In addition, embodiments of the present specification improve detection performance because explosives in certain configurations, which are difficult to detect with X-ray scanners, can now be detected. Moreover, embodiments of the present specification lower the false-alarm rate as some objects that may appear to be explosives when scanned with line scanners will not alarm when scanned with the system described herein. Therefore, the various embodiments of the present specification provide enhanced security to passengers travelling in planes loaded with cargo, and for cargo planes. In addition, the systems of the present specification reduce operational costs associated with scanning as they require less staffing to operate compared to conventional systems.

The present specification is thus directed towards methods and systems for obtaining multiple medium-energy (200 kV-800 kV) scanning views of an object or cargo under inspection, such as a skid, which may be used for improving estimations of the density and atomic number of the cargo contents for enhanced detection of contraband and other materials of interest. In addition, the present specification is directed towards methods and systems for obtaining multiple scanning views of large objects, cargo, and pallets under inspection without the need for rotating cargo or using multiple source arrays or detector arrangements. Finally, the present specification is directed towards methods and systems for obtaining multiple scanning views of cargo comprising more than one box packaged on a single pallet and collectively shrink wrapped without having to remove the shrink wrap, separate the more than one box from each other or the single pallet, and scan the more than one box individually.

In an embodiment, the present specification is directed toward an X-ray system comprising a stationary multi-focus source coupled to an array of X-ray detectors for generating multiple views of an object under inspection. In an embodiment, a stationary high-throughput multiple view system is provided that is capable of inspecting skids and is used to provide a three-dimensional (3D) computed tomography (CT) high-resolution image of the cargo. The numbers of X-ray emitters (source points) are limited in order to achieve a low-cost and an efficient scanner system. In one embodiment, four linear source modules are placed on each of four sides of a tunnel approximating a rectangular shape. The emitters within the source modules are turned on and off in a fast sequence to produce multiple views. An X-ray detector array placed in a single plane is used to measure the transmitted X-ray signals. The 3D density and atomic number images are reconstructed from the views based on the sequence of operation of the emitters (firing sequence), to produce optimal image quality.

Increasing the number of X-ray emitters or source points provides better image quality. However, the cost and complexity of the systems increase as the number of source points increases. Therefore, the systems of the present specification are configured to have the greatest number of source points to enhance image quality while also keeping the number low enough to balance cost and complexity with resolution. Thus, the linear source modules are configured with particular resolution ranges with particular source point numbers and placement density.

In some embodiments, the systems of the present specification comprise four linear source modules positioned on each of four sides of a tunnel. The first of the four linear source modules is preferably placed substantially perpendicular to the third and fourth linear source modules. The second of the four linear source modules is preferably placed substantially perpendicular to the third and fourth linear source modules and parallel to the first of the four linear source modules. The third of the four linear source modules is preferably placed substantially perpendicular to the first and second linear source modules and parallel to the fourth of the four linear source modules. The fourth of the four linear source modules is preferably placed substantially perpendicular to the first and second linear source modules and parallel to the third of the four linear source modules.

Each of the above described linear source modules has a length ranging from 0.5 meters to 5 meters, preferably 1 meter to 2 meters, and includes a range of 2 to 100 source points, wherein each source point is separated from an adjacent source point by a distance in a range of 2 to 50 cm. In one embodiment, each linear source module has a length of 100 cm and includes 2 source points with 50 cm between each source point, for a total of 8 sources (8 views) in the system. In another embodiment, a linear source module has a length of 160 cm and includes 16 source points with 10 cm between each source point, for a total of 64 sources (64 views) in the system. In another embodiment, a linear source module has a length of 150 cm and includes 50 source points with 3 cm between each source point, for a total of 200 sources (200 views) in the system. In yet another embodiment, a linear source module has a length of 200 cm and includes 40 source points with 5 cm between each source point, for a total of 160 sources (160 views) in the system. In some embodiments, there is a dependency relationship between the number of source point emitters and a preferred, desired, or target conveyor speed.

The systems and methods of the present specification differ from CT systems in that the object scanned by the systems of the present specification can be much larger, the X-ray energy is higher to allow for greater penetration and the spacing between sources or emitters is larger. In some embodiments, the sources and detectors are configured in a rectangular pattern around the object. The systems of the present specification produce an image comparable to a 3D CT image, and as the number of sources increases and the spacing between sources decreases, the produced image approaches the quality of a CT image. A large number of sources, however, results in higher cost. Therefore, the systems of the present specification use fewer sources to maintain lower costs while still producing reasonably high quality images.

In addition, the systems of the present specification have lower current requirements by keeping the number of sources lower than in an RTT system. For example, a scanning system might include 100 sources that complete a revolution (all sources are turned on at least once) in 0.1 seconds with a conveyor speed of 10 cm/sec. If a similar system included 1000 sources (approaching CT number of sources), the sources would need to complete a revolution in the same time frame to prevent gaps in the image produced of the object being scanned. Therefore, the sources would need to be turned on and off 10 times faster than in the system having 100 sources. This time is quite short and, in some cases, there would not be enough X-rays per view, resulting in a need to increase the current by 10-fold. Typical systems have a current requirement of 10-20 mAmp, which is already high. This current requirement represents the instantaneous current. However, since one source is on all the time, the current averaged over all the sources is 20 mAmp. In other words, the power supply energizing the sources provides 20 mAmp continuously. Therefore, the systems of the present specification keep the current requirements low by lowering the number of sources compared to CT systems.

In some embodiments, the source emitters are configured to lie in one plane, and the detector array is placed in an adjacent plane instead of being distributed across the tunnel, thereby enabling a compact scanning system. Embodiments of the present specification use one detector array and the sources employ a single power supply. In embodiments, an operating voltage is in a range of 200 kV to 800 kV.

In an embodiment, the number of X-ray emitters that are deployed are variable, enabling corresponding variation in the number of views of the scanned object that can be generated. In one embodiment, the views are varied by deploying a different combination of X-ray emitters. In another embodiment, the views are varied by operating X-ray emitters in a different sequence. In an embodiment, the X-ray source emitters are operated in any desired sequence about the skid under inspection, enabling multiple possibilities for image reconstruction. In embodiments, sequence and/or combination of the X-ray emitters that are deployed are varied, while the number of emitters remains the same. In conventional multi-view systems, in order to change the number of views, the number of sources and/or detectors must also be changed.

It should be noted that the systems described throughout this specification comprise at least one processor to control the operation of the system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium. In various embodiments, the processor, such as a computer or microprocessor, accepts signals generated from all views and combines the data to produce tomographic images. In an embodiment, the processing system may have a graphical processor unit (GPU) to facilitate rapid image reconstruction.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

Figure 2:
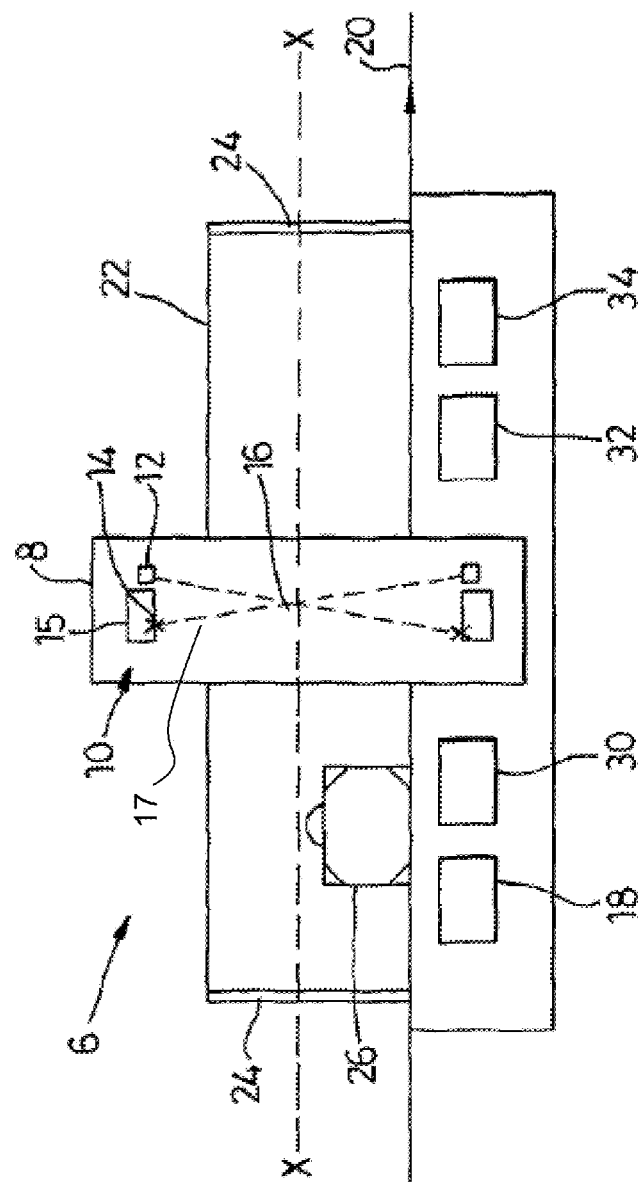
FIG. 2 illustrates a conventional luggage CT scanner having a circular locus of source points and detectors.

Referring to FIG. 2, a conventional real-time tomography inspection system having a circular locus of source points is shown. Concourse baggage scanning system 6 comprises a scanning unit 8 which includes a multi-focus X-ray source 10 and X-ray detector array 12. The source 10 comprises a large number of source points 14 positioned in respective, spaced locations on the source, and arranged in a full 360 degree (or less) circular array about the X-Y axis of the system (which is parallel to the conveyor belt 20). The source 10 can be controlled to produce X-rays from each of the source points 14 in each of the source units individually whereby X-rays from each source point 14 are directed inwards through the scanning region 16 within the circular source 10. The source 10 is controlled by a control unit 18 which controls the applied electrical potentials (to the grid wires) and hence controls the emission of X-rays from each of the source points 14. By electronically scanning the multi-focus X-ray tube, X-ray source virtual "motion" is created with no actual physical movement of mechanical parts.

The detector array 12 is also circular and arranged around the axis X-X in a position that is slightly offset in the axial direction from the source 10. The source 10 is arranged to direct the X-rays it produces through the scanning region 16 towards the detector array 12 on the opposite side of the scanning region. The volume of the scanning region is in the form of a thin slice perpendicular to the scanner axis X-Y. The source is scanned so that each source point emits X-rays for a respective period, the emitting periods being arranged in a predetermined order. As each source point 14 emits X-rays, the signals from the detectors 12, which are dependent on the intensity of the X-rays incident on the detector, are produced, and the intensity data that the signals provide are recorded in a memory. When the source has completed its scan, the detector signals can be processed to form an image of the scanned volume using filtered back-projection methods or iterative reconstruction methods.

For the purposes of this specification, a filtered back-projection method is defined as any transmission or diffraction tomographic technique for the partial or complete reconstruction of an image of an object where a filtered projection is back-projected into the object space; i.e., is propagated back into object space according to an inverse or approximate inverse of the manner in which the beam was originally transmitted or diffracted. The filtered back-projection method is usually implemented in the form of a convolution of filters and directly calculates the image in a single reconstruction step.

For the purposes of this specification an iterative reconstruction method refers to iterative algorithms used to reconstruct 2D and 3D images such as computed tomography where an image must be reconstructed from projections of an object in multiple reconstruction steps.

In various embodiments of the present specification, a stationary, non-circular locus of source points is used to scan a scanning volume. This provides an inspection system having a smaller footprint with the same inspection volume as the scanning system shown in FIG. 2. Also, it is easier and less expensive to manufacture linear arrays of sources and detectors. In embodiments of the present specification, the operating voltage is in a range of approximately 200 kV to 800 kV.

Figure 3A:
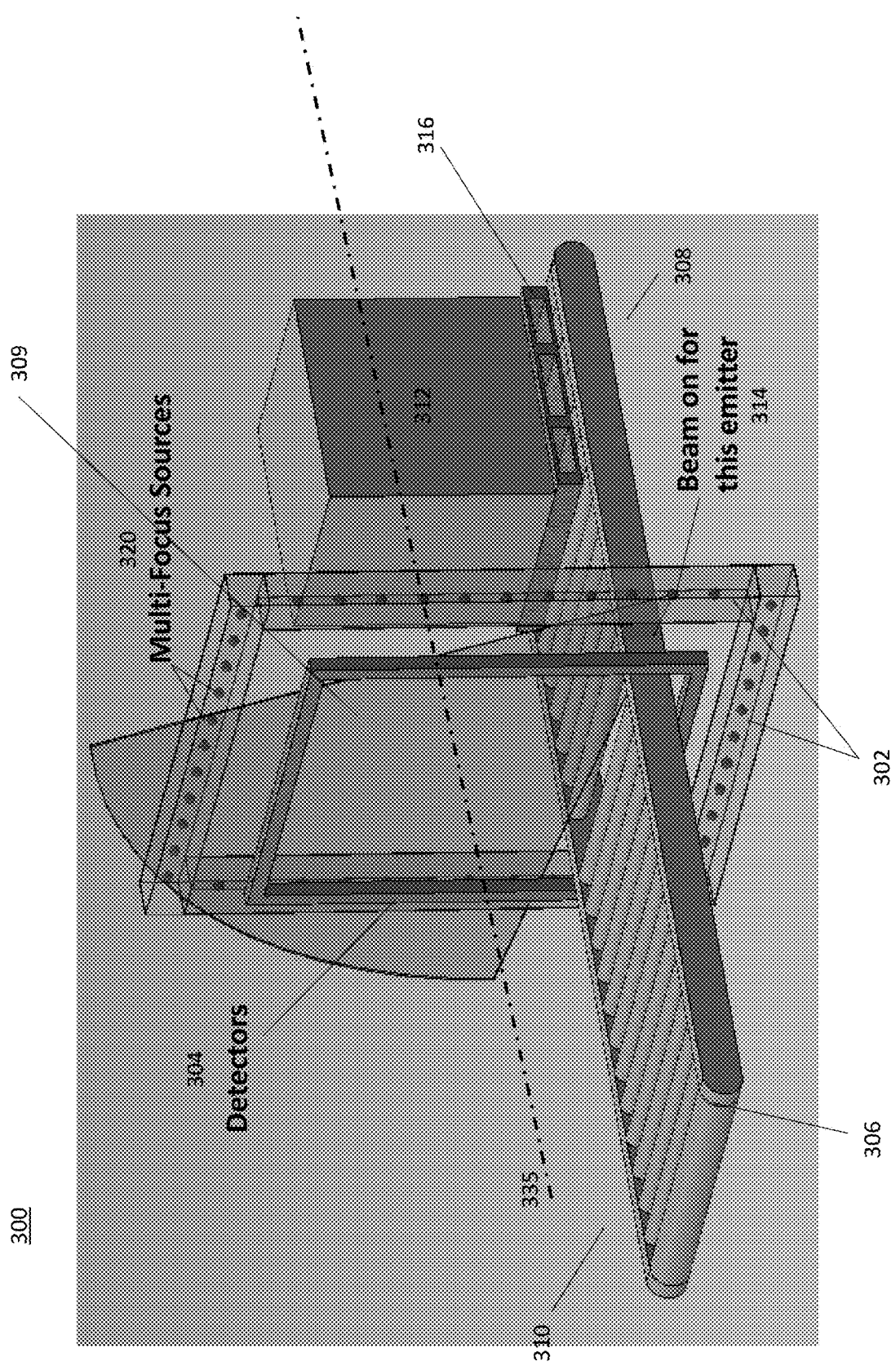
FIG. 3A is an oblique perspective view of a scanning unit, comprising a multi-focus X-ray source and a detector array placed in a substantially quadrilateral shape around a scanning volume, in accordance with an embodiment of the present specification.

In accordance with an embodiment of the present specification, FIGS. 3A through 3C illustrate perspective side and front views, respectively, of a scanning unit 300, comprising a multi-focus X-ray source 302 and a detector array 304 placed in a substantially rectangular geometry, shape or configuration around an inspection or scanning volume, tunnel or region 309. In embodiments, the inspection or scanning volume 309 is substantially rectangular with dimensions ranging from 1 m to 2 m in each direction.

Referring simultaneously to FIGS. 3A through 3C, the system 300 generates a plurality of views by activating at least one X-ray source point 320 at a time, following a firing sequence, around an object 312 to be scanned within scanning volume 309. The at least one X-ray source point 320 emits X-ray beams that are translated over a substantial portion of the scanning volume, which, in one embodiment, would include the entire portion of the scanning volume and/or the complete volume of the object. In embodiments, a conveyor 306 comprises a set of rollers to move object 312 (optionally, positioned upon pallet 316) through the tunnel 309. A typical source configuration generally includes a plurality, such as tens, of source points 320 and one detector array 304, described in greater detail throughout this specification. Source points 320 are sparsely positioned around the volume of the scanning region 309. The number of source points 320 may be less than the numbers used by conventional RTT scanners but are sufficiently high enough to reproduce scan-images that enable threat detection with reasonable accuracy.

Radiation from X-ray source points 320 is detected by the detector array 304. In an embodiment, detector array 304 comprises discrete detector modules placed around the tunnel. In one embodiment, the detector array 304 replicates the shape or geometry of the X-ray source 302 and is thus placed in a substantially rectangular shape around the scanning volume 309. In an embodiment, multi-focus source 302 and detector array 304 are positioned on respective planes. In embodiments, the plane of the detector array 304 is offset from the plane of X-ray source 302 so that the detectors do not block the beam. The plane of the detector array is offset from the plane of the X-ray source by a minimum distance to ensure that the detectors do not occlude the source. The minimum distance is dependent upon the configuration of the system. Thus, while the plane of the detector array 304 is parallel to the plane of X-ray source 302, the surfaces of the detector array and source do not fully overlap, as viewed along an axial line perpendicular to both the detector array plane and X-ray source plane.

X-ray source 302 is arranged to direct the X-rays it produces from source points 320, through the scanning region 309 towards the detector array 304, and toward an opposite side of the scanning region 309. The volume of the scanning region 309 that is scanned and imaged is therefore in the form of a slice nearly perpendicular to the longitudinal axis 335 which is the direction of transport of the object 312 being scanned. X-ray source 302 is operated so that each source point 320 emits X-rays for a respective period, the emitting periods being arranged in a predetermined order. The X-rays produced by source points 320 and transmitted through the skid are measured using detector array 304. When sufficient data has been acquired, the detector signals can be processed to form an image of the scanned object.

It should be appreciated that, in alternative embodiments, the scanning tunnel 309 preferably has a quadrilateral shape, such as, but not limited to, a square, or may have any other shape that utilizes linear arrays of the multiple source points or emitters to be placed partially or wholly around to form scanning region 309. In one embodiment, object 312 moves at constant speed (or nearly constant but measured speed). While it is preferred that the speed is constant, any variation in speed can be compensated for during measurement by triggering source points 320 and adjusting the emitting period, based on speed. In one embodiment, object 312 is moved on the conveyor 306. In embodiments, object 312 under inspection (along with pallet 316) is conveyed on the conveyor 306 through a first open end 308, enters the inspection region 309 and is transported through the imaging volume along a longitudinal axis 335, and exits through a second open end 310 (opposite to the first open end 308).

In an optional embodiment, conveyor 306 incorporates a rotating mechanism that enables rotating the cargo 312 around a vertical axis, where the axis is perpendicular to the plane of conveyor 306. Rotation of object 312 within the imaging region may enable additional views to be generated for object 312, which could enhance the image quality that is typically produced with a stationary source and detector assembly within a scanning system.

It should be noted however, that rotation of an object not only requires a rotating mechanism but also needs a wider inspection tunnel, volume or region to accommodate the object that might have a wider dimension that must be accommodated in the tunnel on rotation. Thus, in preferred embodiments, the X-ray source 302 includes a sufficient number of source points 320 to generate scan images of sufficient quality without the need for rotation of the object 312 and pallet 316. Object 312 may be a ULD, pallet, or any other large cargo unit that can be scanned by embodiments of the present specification.

In the scanning unit 300 shown, a main electronic control system, a processing system, a power supply, and cooling rack(s) may be mounted underneath conveyor 306. Conveyor 306 may be arranged to be operated normally with a continuous scanning movement at a constant speed. In some embodiments, the conveyor speed ranges from 0.01 m/s (meters per second) to 1 m/s, and preferably 0.1 m/s (meters per second) to 0.5 m/s.

In accordance with an embodiment, the source points 320 (also referred to as electron guns or emitters) are housed or contained in four linear source modules 302a, 302b, 302c, 302d placed respectively on first, second, third and fourth sides of the imaging volume or region 309. The plurality of source points or electron guns 320 are serially arranged in a linear array in each of the four linear source modules 302a, 302b, 302c, 302d thereby forming a substantially non-circular, such as rectangular, geometry around the imaging or inspection volume 309. In some embodiments, the rectangle has dimensions ranging from 1 m to 2 m in each direction. In some embodiments, each of the four linear source modules includes 10 source points, emitters or electron guns 320 equidistantly spaced from each other along the length of each linear source module, as a result of which the source 302 has a total of 40 (10×4) source points 320. In various embodiments, the source modules 302a, 302b, 302c, 302d are connected to a single high-voltage power supply in a daisy chain.

In a preferred embodiment, the electron beam is a single energy beam and detectors are either dual or multi energy to allow for the production of images with atomic number information. In another embodiment, the detectors are single-energy detectors and the X-ray energy is switched quickly between a low and a high energy.

In accordance with an embodiment, the detector array 304 includes first, second, third and fourth linear detector modules 304a, 304b, 304c, 304d corresponding to respective first, second, third and fourth sides of the imaging volume or region 309, thereby forming a substantially non-circular, such as rectangular, geometry around the region 309.

In an embodiment, source points 320 are turned on and off in fast sequence to produce multiple views. In some embodiments, X-ray source firing pattern is not constrained, such that it does not move in a standard helical rotation about object 312 under inspection. In some embodiments, the firing pattern follows a predetermined sequence of switching the source points on and off. Thus, in various embodiments, the source firing pattern may be predetermined with uniform or non-uniform dwell time at each source point 320. The amount of time that each individual X-ray source point 320 is on can be adjusted electronically, and in real-time, while during each source exposure, source point 320 is stationary (rather than moving as is the case with a conventional rotating gantry CT system). In various embodiments, the dwell time ranges from 50 μs to 500 μs per scan projection. The dwell time may be varied based on a desired throughput for scanning multiple objects such as object 312. The dwell times may also be varied based on the path length of the x-rays through object 312. For example, source positions that produce X-rays that traverse the cargo diagonally may dwell longer than sources with shorter path lengths.

In other embodiments, a first plane 325 of X-ray sources 302 and a second plane 330 of detector array 304 are offset from each other in the direction of the longitudinal axis 335 of the scanning system 300, in which the direction of transporting object 312 is defined. In embodiments, the offset between the first and second planes 325, 330 depends on a width of the detector array 304 while simultaneously maintaining a safe distance with the source 302. A safe distance is essential in order to ensure that a beam emitted by a source point 320 may not have to go through the detectors of the near side (near to source point 320) to hit the detectors of the far side. In various embodiments, the offset between the first and second planes 325, 330 is in a range of 2 to 3 cm. The three-dimensional (3D) density and atomic number (Z) images are reconstructed from the views based on the firing sequence selected for source points 320 to produce an optimal image quality. In an embodiment, system 300 with 40 source points (10 on each side) is fired at 125-microsecond intervals to scan a skid moving at 20 cm/sec to reconstruct 3D density and Z images in real-time. In accordance with aspects of the present specification, the source points 320 are sparsely distributed (that is, the number of source points are fewer than those used in conventional RTT systems) around the imaging region 309, enabling limiting yet sufficient multi-view scans to image object 312 with reasonable accuracy and image quality. In some embodiments, the source points are separated by a distance of at least 2 cm from each other, relative to a distance of 5 mm between source points in a conventional fixed source, non-rotating CT X-ray system (wherein every other source point is fired during a scan for an effective distance of 10 mm). Spreading the distribution of source points 320, sparsely, around source 302 provides limited view sampling of object 312 under inspection at reasonable image quality, while at the same time using fewer source points or emitters 320 reduces the overall system cost.

In accordance with embodiments, the sparsely distributed source points 320 are substantially equidistantly placed on each of the four source modules 302a, 302b, 302c, 302d of source 302. In some embodiments, the source 302 having first, second, third and fourth linear source modules 302a, 302b, 302c, 302d forming a rectangular geometry around the scanning region 309, may include a total of 40 to 80 source points 320 (in contrast with conventional RTT systems that may comprise hundreds of electron guns or source points). In embodiments, each source module 302a, 302b, 302c, 302d, may include 10 to 20 source points that total to 40 to 80 source points. In an embodiment, the center of each source point 320 is spaced at about 5 cm from one another. In alternate embodiments, any number of source points 320 could be used to produce a corresponding number of views. As the number of source points 320 increase, the image quality obtained from the scanning improves. Therefore, in alternative embodiments, multi-view scanning unit 300 may have more than 20 source points 320 on each source module 302a, 302b, 302c, 302d, for a total of more than 80 source points. In yet another embodiment, there may be 30 source points 320 on each source module 302a, 302b, 302c, 302d.

The spacing between source points 320 may vary with their numbers and the dimensions of the source modules 302a, 302b, 302c, 302d of the source 302. In some embodiments, the systems of the present specification include a range of between 10 and 200 source points 320 (electron guns or emitters) per linear module or side 302a, 302b, 302c, 302d of the source 302. Additionally, in some embodiments, each linear module or side 302a, 302b, 302c, 302d has a length ranging from 1 to 2 meters, and preferably, 1.5 meters. In some embodiments, the source points 320 on each linear module or side 302a, 302b, 302c, 302d are spaced apart equidistantly. Therefore, in various embodiments, the source points 320 on each source module 302a, 302b, 302c, 302d are spaced in a range between 5 to 200 mm apart from one another.

In embodiments, every emission source point 320 has a different field of view (FOV). In various embodiments, X-ray source points 320 emit fan beams which have different beam angles based on the location of the X-ray source points with respect to the imaging volume. Conventional Real Time Tomography (RTT) systems with the source points arranged in a circular geometry have the same X-ray beam angle or angle of coverage emanating from each source point. In the embodiments of the present specification, the beam angles are different for different source points, owing to the different distances from each source point to detector element in the beam path. In embodiments, a field of view is reconstructed for a rectangular inspection tunnel region. Specifically, closer to the edges, the beam angle made by the emitted X-rays is more narrow; while closer to the middle of the scanning volume, the beam angle made by the emitted X-rays is broader. In some embodiments, the beam angles range from approximately 30 degrees to 160 degrees, or any numerical increment therein, and more preferably 60 degrees to 120 degrees. Therefore, in one embodiment, the system is configured such that X-ray sources closer to the ends of each of the linear source modules have beam angles that are smaller than X-ray sources closer to the middle of each of the linear source modules. In another embodiment, while the beam angle of the X-ray sources varies along the length of a single linear source module, the beam angle variance is the same across all linear source modules. Therefore, the beam angles of each of the first, second, third, and fourth linear source modules may be described, in one embodiment, as:

- For all X-ray sources in a given linear source module between 1 and m, the beam angle is less than Y, where Y is between 60 degrees and 120 degrees and where X-ray source 1 is proximate a linear source module perpendicularly positioned relative to the given linear source module.
- For all X-ray sources in a given linear source module between n and z, the beam angle is also less than Y, where Y is between 60 degrees and 120 degrees and where X-ray source z is proximate a linear source module perpendicularly positioned relative to the given linear source module and is 100 or less.
- For all X-ray sources in the given linear source module between m and n, the beam angle is less than Z, where Z is greater than Y but also between 60 degrees and 120 degrees and where the X-ray sources from m to n are further away from linear source modules perpendicularly positioned relative to the given linear source module relative to 1 or z.

In preferred embodiments of the present specification, Multi-Energy (ME) detectors are used because they provide sufficient information for an accurate atomic number determination. The most common ME detectors are Cadmium Zinc Telluride (CZT) or Cadmium Telluride (CdTe). In still other embodiments of the present specification, any one or more of other types of detectors, including but not limited to linear array detectors that are one-dimensional (1D), or two dimensional (2D), single energy, or DE detectors, may be used.

The preferred embodiments utilize iterative reconstruction algorithms over standard Filter Back Projection (FBP) reconstruction because they perform better with incomplete data sets. In an embodiment, metal artefacts reduction methods are employed to reduce the streaks that mask the structure of objects neighboring metal objects.

The iterative reconstruction algorithms may be optimized for execution on low-cost Commercial Off-The-Shelf (COTS) graphics processing units (GPUs) and may operate at the full data acquisition rate in real-time. This ensures that the reconstructed image is available as soon as the trailing edge of pallet 316 carrying object 312 leaves the imaging region 309 of the system 300. The system may be configured to achieve reconstructed image voxels of 2 mm×2 mm×2 mm.

Figure 4:
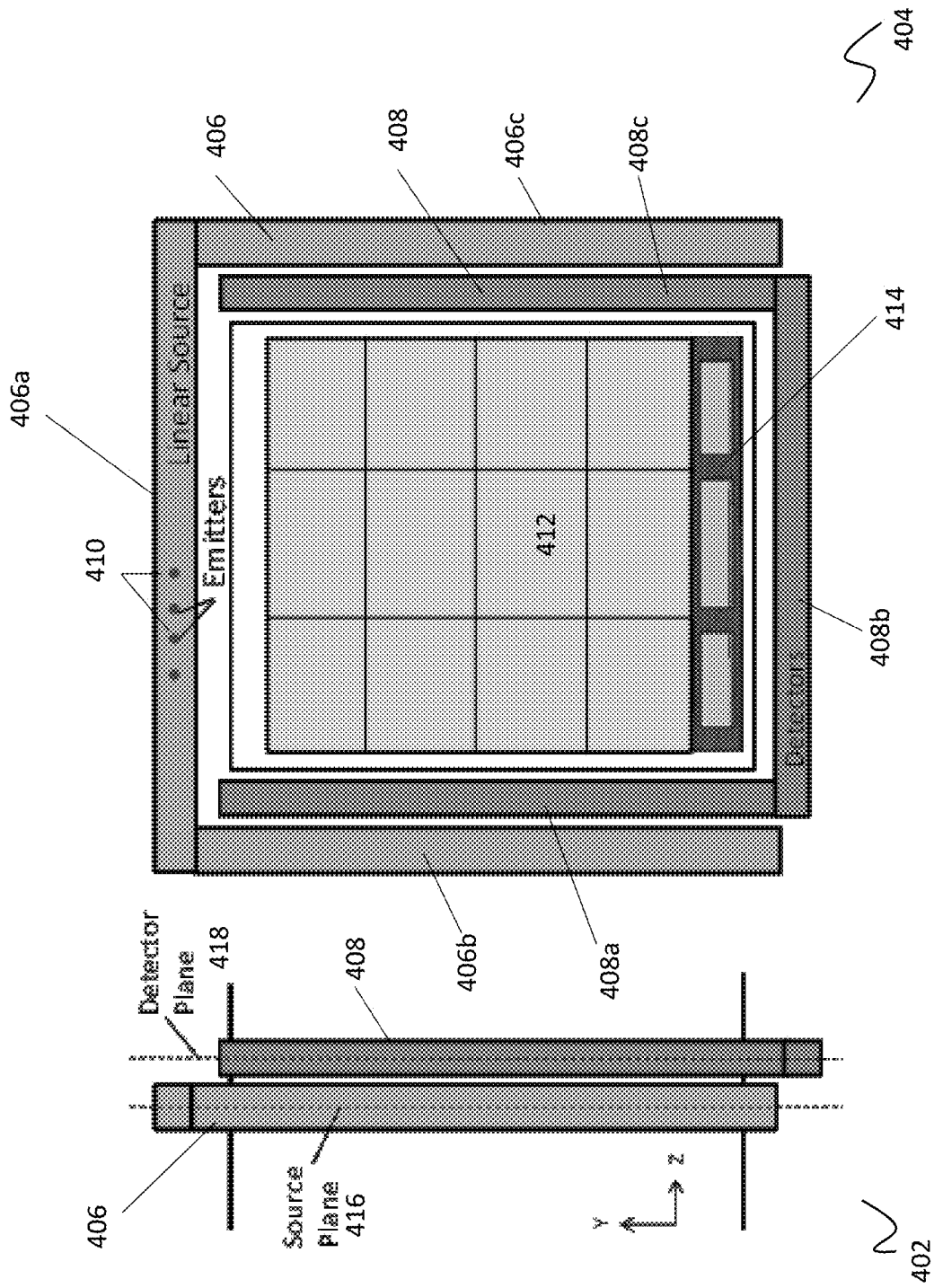
FIG. 4 illustrates side and front views of a scanning unit, in accordance with an embodiment of the present specification.

Referring to FIG. 4, an alternative embodiment of an arrangement of a multi-focus source and detectors is shown. In this exemplary embodiment, instead of using source points and detectors on all sides of the inspection volume, region or tunnel, they are configured to encapsulate the tunnel linearly from three sides, forming a "U" shape. FIG. 4 illustrates a side view 402 and a corresponding front view 404 of a multi-focus X-ray source 406 and a detector array 408 assembly. Side view 402 shows source 406 and detector array 408 in two different planes. Source 406 is in a first plane 416 whereas detector array 408 is in a second plane 418, such that the first and second planes 416, 418 are offset from one another. Front view 404 shows a space between source 406 and detector array 408. In embodiments, source 406 includes three linear source modules 406a, 406b, 406c comprising source points, electron guns or emitters 410, which encapsulate the imaging tunnel from corresponding three sides forming a substantially (inverted) "U" shape, while a fourth side does not include source 406. Similarly, detector 408 includes three linear detector modules 408a, 408b, 408c that encapsulate the imaging tunnel from three corresponding sides thereby also forming a substantially (upright) "U" shape. X-ray beams emitted by source points, electron guns or emitters 410 are detected by detectors 408. In embodiments, the source modules 406a, 406b, 406c are connected to a single high-voltage power supply in a daisy chain.

In embodiments, all points in the imaging tunnel would still have 180-degrees worth of views provided by different emitters 410 on the three sides of the tunnel, thereby allowing for a complete CT reconstruction. It should be appreciated that since the source 406 and detector array 408 are not in the same plane, the embodiment of FIG. 4 does not produce a complete set for CT reconstruction where the source and detector arrays are in the same plane or when the detectors and sources cover 360 degrees as in the embodiment of FIG. 3. However, the embodiment of FIG. 4 provides an advantageous optimization between image quality and an overall cost.

Figure 5:
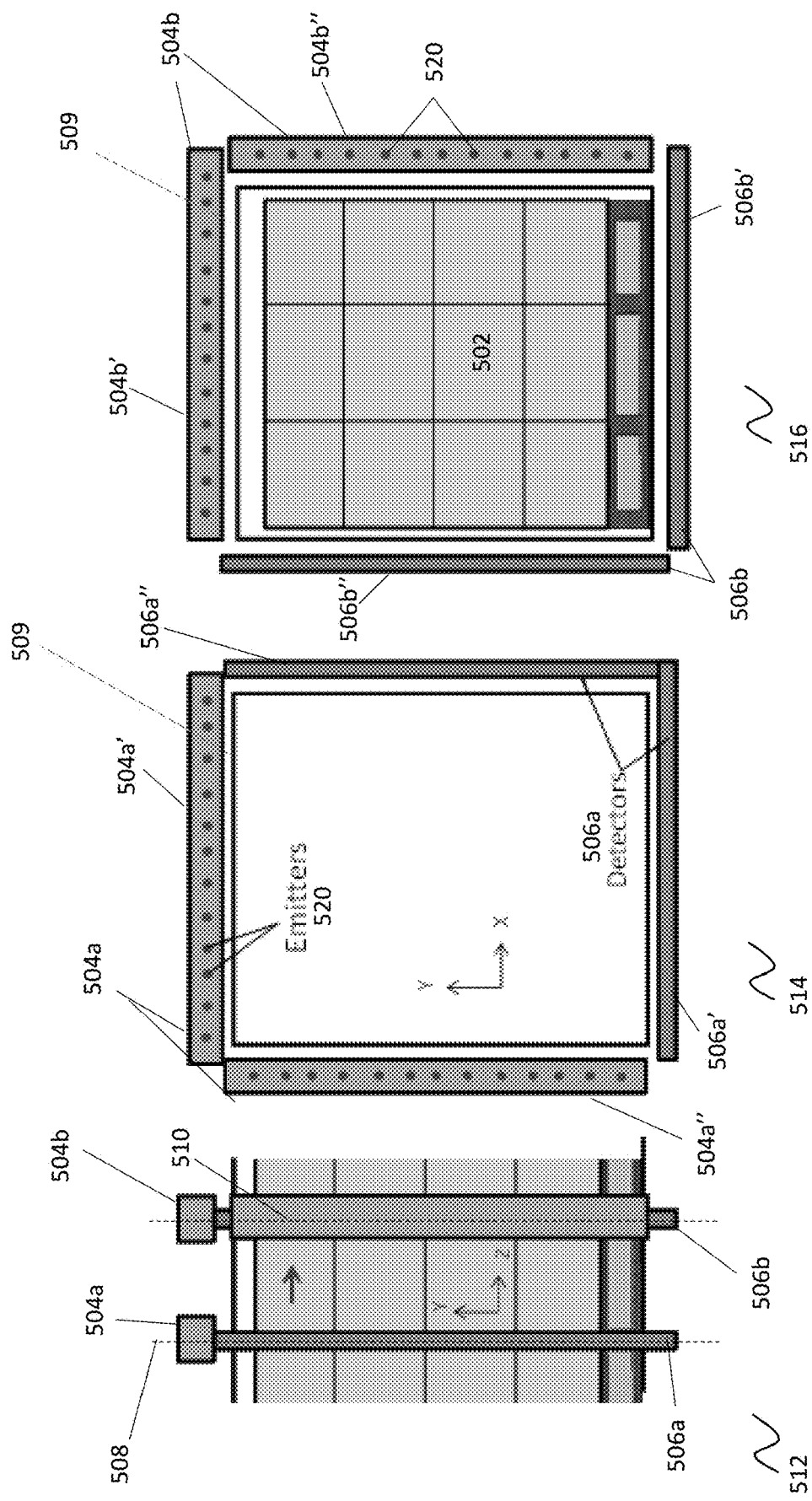
FIG. 5 illustrates side and front views of a scanning unit, in accordance with another embodiment of the present specification.

Referring to FIG. 5, yet another alternative embodiment of an arrangement of a multi-focus source and detectors is shown. In this exemplary embodiment, first and second source-detector assemblies are provided, which are shifted or offset from one another in a direction Z of scanning motion of an object 502 to be scanned. A first source-detector assembly may include a source 504a and a detector 506a, which lie on a first plane 508. A second source-detector assembly may include a source 504b and a detector 506b, which lie on a second plane 510. In embodiments, the first and second planes 508, 510 are offset from one another along a direction Z of scanning motion of the object 502. In some embodiments, the offset between the first and second planes 508, 510 is in a range of 0.1 to 15 cm, preferably 2 to 3 cm.

FIG. 5 illustrates a side view 512, and corresponding front views 514, 516 of sources 504a and detectors 506a, and sources 504b and 506b, respectively. In embodiments, the source 504a includes a plurality of source points, electron guns or emitters 520 contained in first and second linear source modules 504a', 504a". Also, the detector array 506a includes first and second detector modules 506a', 506a". In embodiments, the source modules 504a', 504a" are positioned on first and second adjacent sides of the scanning volume 509 to form a substantially right angle (such as an "L" shape) while the detector modules 506a', 506a" are positioned on third and fourth sides of the scanning volume 509 to also form a substantially right angle (such as an "L" shape). The source modules 504a', 504a" and oppositely positioned corresponding detector modules 506a', 506a" together form a substantially rectangular geometry around the imaging tunnel.

Similarly, the source 504b includes a plurality of source points, electron guns or emitters 520 contained in first and second linear source modules 504b', 504b". Also, the detector array 506b includes first and second linear detector modules 506b', 506b". In embodiments, the source modules 504b', 504b" are positioned on first and fourth adjacent sides of the scanning volume 509 to form a substantially right angle (such as an "L" shape) while the detector modules 506b', 506b" are positioned on second and third sides of the scanning volume 509 to also form a substantially right angle (such as an "L" shape). The source modules 504b', 504b" and oppositely positioned corresponding detector modules 506b', 506b" also form a substantially rectangular geometry around the imaging tunnel.

In embodiments, the acquisition frequency is synchronized with the speed of the skid that moves object 502, so as to ensure that the same slices of object 502 are used in the reconstruction from both planes 508 and 510. It should be appreciated that in contrast to the embodiment of FIG. 4, the embodiment of FIG. 5 enables a complete set of scan data to be generated allowing for a complete CT reconstruction since the associated source and detectors in each of the first and second source-detector assembly lie in the same respective planes. Another advantage of this embodiment is that it allows increasing the number of X-rays, and in turn image quality, because the source-detector assemblies can be connected to two separate power supplies and one source in each assembly can be fired simultaneously.

FIGS. 6A and 6B illustrate side and front views, respectively, of a multi-view scanning system 600 in accordance with an embodiment of the present specification. Referring now to FIGS. 6A and 6B, the system 600 comprises a multi-focus source 602 having a plurality of source points, electron guns or emitters 620 and a detector array 604 arranged around a scanning or inspection volume, region or tunnel 609. X-ray beams from the plurality of source points 620 penetrate an object 612 and pallet 616 and are detected by the detector array 604 to generate scan images as the object 612 and pallet 616 are conveyed along a longitudinal direction 625 of scanning.

In some embodiments, the plurality of source points 620 are contained in a linear source module 602a corresponding to a first side of the inspection volume 609. The detector array 604 includes first, second and third linear detector modules 604a, 604b, 604c corresponding to respective second, third and fourth sides of the inspection volume 609. In other words, the linear source module 602a and the three linear detector modules 604a, 604b, 604c together form four sides enclosing the inspection volume 609. In various embodiments, the detector array 604 and the multi-focus source 602 lie in the same plane.

In alternate embodiments, the plurality of source points 620 may be contained in three linear source modules corresponding to first, second and third sides of the inspection volume 609 while the detector array 604 includes a single linear detector module corresponding to the fourth side of the inspection volume 609. In still other alternate embodiments, the plurality of source points 620 may be contained in two linear source modules corresponding to first and second sides of the inspection volume 609 while the detector array 604 also includes two linear detector modules corresponding to the third and fourth sides of the inspection volume 609. The two linear source modules are positioned on sides opposite to the two detector modules such that X-ray beams generated by the plurality of source points (of the two linear source modules) penetrate the object 612 and pallet 616 to strike the two detector modules. It should be appreciated that in all these embodiments, the detector array and the multi-focus source lie in the same plane.

In various embodiments, the multi-focus source 602 and detector array 604 together form a substantially rectangular geometry around the inspection volume 609.

Figure 6:
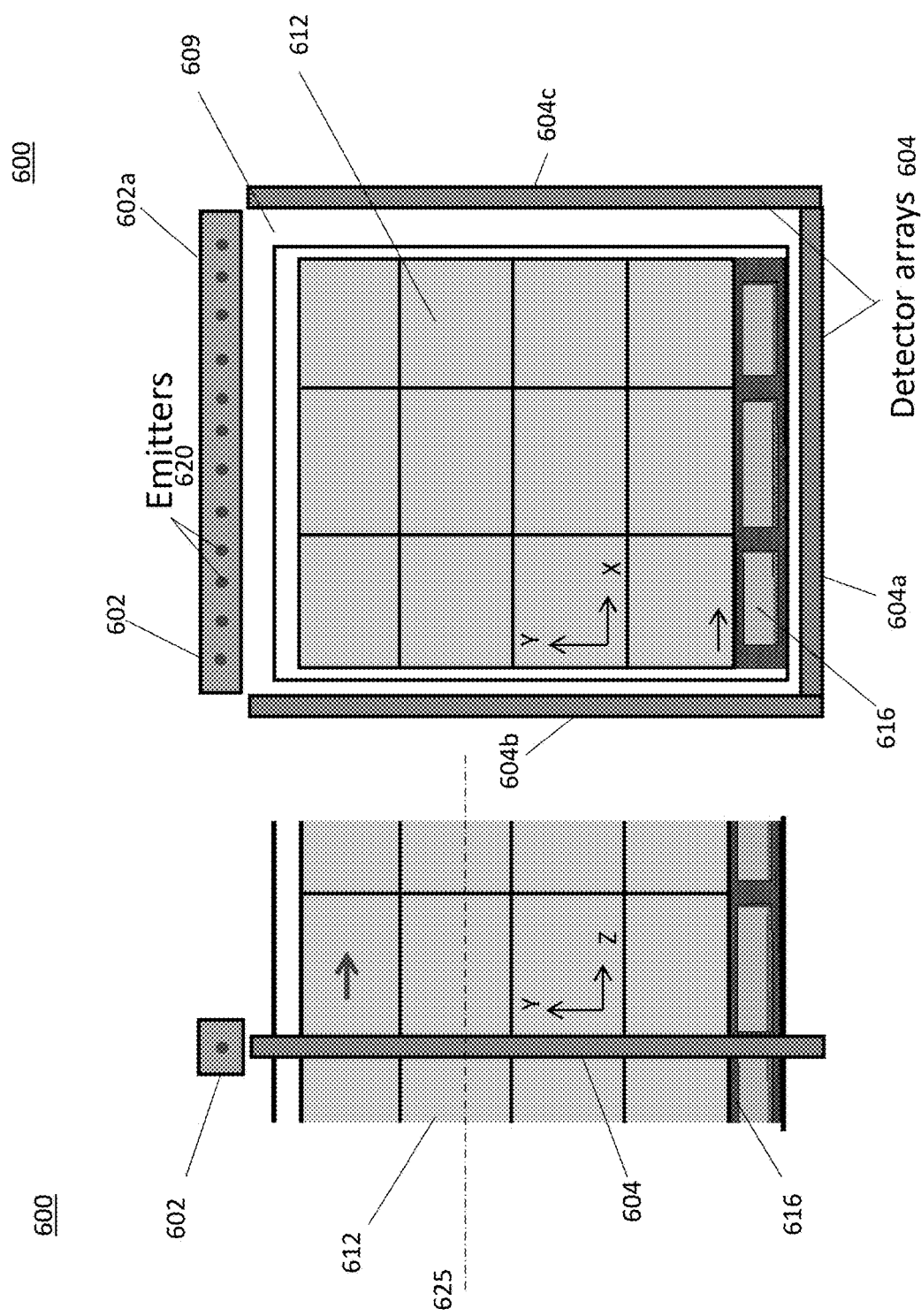
FIG. 6A illustrates a side view of a scanning unit, in accordance with yet another embodiment of the present specification.
FIG. 6B illustrates a front view of the scanning unit of FIG. 6A.

The embodiment shown in FIG. 6 and its variations do not produce a complete set of data for CT reconstruction. The data obtained from these embodiments can be reconstructed into 3D images but will not have the higher image quality of the previous embodiments. However, the systems based on these embodiments are simpler to integrate and less costly than the system based on previous embodiments.

Figure 7:
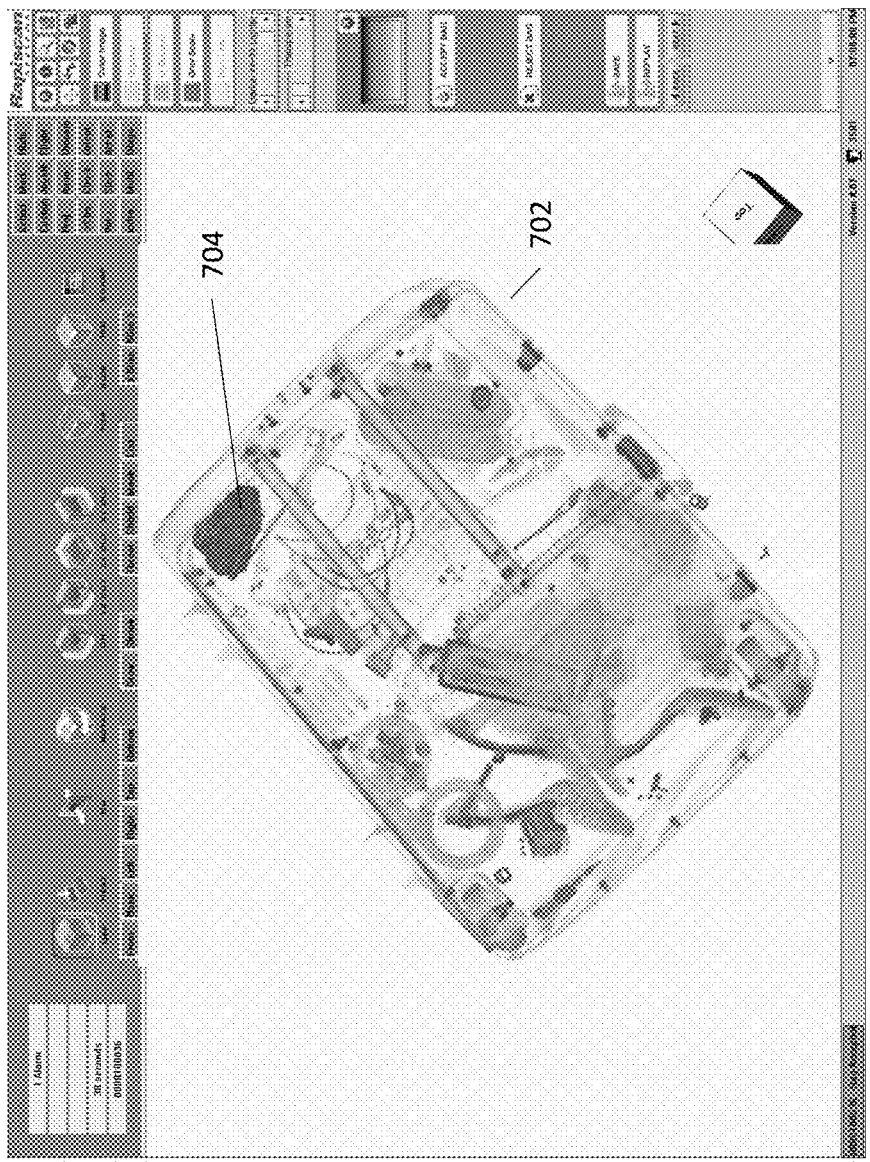
FIG. 7 illustrates an exemplary Graphical User Interface (GUI), in accordance with some embodiments of the present specification.

FIG. 7 illustrates an exemplary Graphical User Interface (GUI) which allows displaying 3D images, has rotate functions, selection and display of slices, standard image processing tools, among other features, in accordance with some embodiments of the present specification. FIG. 7 shows a 3D image 702 of a bag produced by the RTT with automatic detection of threat 704 that is indicated in red.

With a sufficiently large number of views, embodiments of the present specification can produce high-resolution 3D "density" and effective Z images with little or no object superposition. Density and Z are then used to determine composition of cargo and enable material discrimination.

The various embodiments of the present specification described above can also be implemented in a mobile configuration to allow for fast deployment. An X-ray system, such as unit 300 of FIG. 3 described above in the present specification, is positioned within a mobile trailer, vehicle, truck, container, or other carrier. A shielding within the carrier may constrain radiation leakage external to the scanning area. An operator room may be positioned separate and apart from the mobile carrier and may contain all of the controls required to start, stop, or otherwise control the operation of the scanning unit and the skid or the conveyor system. In an embodiment, the carrier ceiling may have openings to allow for source positioning or motion.

FIG. 8 is a flow chart illustrating exemplary steps of a method of scanning an object using an X-ray scanner having a scanning or inspection volume or tunnel, in accordance with some embodiments of the present specification. At 802, the object to be scanned is transported through the imaging volume of the X-ray scanner at constant speed. In embodiments, the object may be a ULD, a pallet, or any other small or large cargo unit. In one embodiment, the object moves at a constant speed over a conveyor or a skid from a side to a second side opposite and in continuity to the first side. Skid may carry the object to be inspected through the imaging volume along a longitudinal axis of a path of transporting the object within scanner.

At 804, the object being transported is irradiated with the X-rays emitted by source points located within an enclosure and detected by a detector array. In embodiments of the present specification, the source points are sparsely distributed in four linear source modules of the source around the imaging volume. In some embodiments, the four linear source modules that comprise the source form a rectangular geometry around the imaging volume. In one embodiment, a rectangular geometry of the source includes four linear source modules that surround the imaging volume, and each array comprises at least 10 source points. The detector array also includes four linear detector modules surrounding the imaging volume in a rectangular geometry with the detector plane offset from the source plane.

In an alternative embodiment, three linear source modules comprising the source surround the imaging volume from three sides, and therefore include three linear source modules. In some embodiments, three linear detector modules (placed in opposing relationship with reference to the three sides having three linear source modules) surround the imaging volume from three sides, wherein the source and detector modules lie in two adjacent planes. Alternatively, a linear detector module may form a fourth side of the imaging volume, in one embodiment, where the source modules and the detector module lie in the same plane. In yet another alternative embodiment, the linear source modules surround the imaging volume from two contiguous sides, with associated two detector modules placed on the two sides opposite to the ones having the two linear source modules.

At 806, the X-rays transmitted through the object are detected by the detector array. In embodiments, the detector array includes a plurality of detector modules that are positioned in a geometry around the imaging volume such that at least one detector module is able to detect X-rays emitted by a source point on an opposite side of the imaging volume. In some embodiments, the at least one detector module is able to detect X-rays emitted by source points adjacent to the detector module, in addition to the X-rays emitted from source points on the opposite side of the imaging volume. The detector modules may comprise programmable energy bins for accurate Z-effective measurements while executing image reconstruction algorithms. In one embodiment, the detector array comprises detector modules positioned in linear arrays in a non-circular geometry, similar to the geometry of the source. In some embodiments, the detector array is slightly offset from the source in a direction of transporting the object on the conveyor.

At 808, the object is detected for presence of a threat or contraband through an analysis of sinogram data and/or reconstructed image data. Sinogram data is the multi-energy "raw" data produced by the X-ray detectors for each source projection. The image reconstruction data obtained from one or more multi-energy bins is used in determining threat type for each object segmented from the image data, which is preferably three-Dimensional (3D). In embodiments, iterative reconstruction algorithms in order to produce significantly enhanced image quality.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. An inspection system to scan an object, comprising:
   a conveyor to transport the object through a scanning volume for inspection;
   a first linear X-ray source module comprising a first plurality of stationary source points configured to emit X-rays and serially positioned along a length of the first linear X-ray source module;
   a second linear X-ray source module comprising a second plurality of stationary source points configured to emit X-rays and serially positioned along a length of the second linear X-ray source module, wherein the second linear X-ray source module is perpendicularly positioned relative to the first linear X-ray source module;
   a third linear X-ray source module comprising a third plurality of stationary source points configured to emit X-rays and serially positioned along a length of the third linear X-ray source module, wherein the third linear X-ray source module is perpendicularly positioned relative to the first linear X-ray source module and is positioned in parallel to the second linear X-ray source module;
   a fourth linear X-ray source module comprising a fourth plurality of stationary source points configured to emit X-rays and serially positioned along a length of the fourth linear X-ray source module, wherein the fourth linear X-ray source module is perpendicularly positioned relative to the second and third linear X-ray source modules and is positioned in parallel to the first linear X-ray source module, wherein the first, second, third, and fourth linear X-ray source modules define the scanning volume, and wherein each source point of the first, second, third and fourth plurality of stationary source points has a field of view and wherein the field of view is smaller for source points closer to an end of the first, second, third, or fourth linear X-ray source module compared to source points closer to a center of the first, second, third, or fourth linear X-ray source module;
   a detector array having a plurality of detector modules arranged around the scanning volume to detect X-rays transmitted through the scanning volume and generate scan data;
   a controller configured to activate and deactivate each of the source points of the first, second, third, and fourth plurality of stationary source points in a predefined sequence; and
   a processor for processing the scan data to reconstruct three dimensional images of the object.

2. The inspection system of claim 1, wherein a length of each detector module is in a range from 1 to 2 meters.

3. The inspection system of claim 1, wherein a number of source points in the first plurality of stationary source points, the second plurality of stationary source points, the third plurality of stationary points, and the fourth plurality of stationary source points is at least two.

4. The inspection system of claim 1, wherein a number of source points in the first plurality of stationary source points, the second plurality of stationary source points, the third plurality of stationary points, and the fourth plurality of stationary source points is in a range of 2 to 100 and wherein each of said source points in each of the first, second, third, and fourth plurality of stationary source points is positioned equidistant from each other.

5. The inspection system of claim 4, wherein the detector array comprises four detector modules, wherein each of the four detector modules is positioned between one of the first, second, third, and fourth linear X-ray source modules and the object, and wherein a plane of the detector array is offset from a plane of the first, second, third, and fourth plurality of stationary source points in a direction of conveyance of the object.

6. The inspection system of claim 5, wherein the plane of the detector array is offset from the plane of the first, second, third and fourth plurality of stationary source points by a distance in a range of 2 to 3 cm.

7. The inspection system of claim 1, wherein the detector array is at least one of a linear array comprising a 1 dimensional array or a 2 dimensional array.

8. The inspection system of claim 1, wherein the detector array is at least one of a single energy detector array, a dual energy detector array, or a multi-energy detector array.

9. The inspection system of claim 1, further comprising a voltage supply, wherein the voltage supply is configured to provide voltage in a range of 200 kV to 800 kV to the first, second, third, and fourth plurality of stationary source points.

10. The inspection system of claim 1, where a linear dimension of a cross-section of the scanning volume is between 1 to 2 meters.

11. The inspection system of claim 1, wherein the controller is configured to activate each source point of the first, second, third and fourth plurality of stationary source points for a dwell time of 100 μs to 500 μs per scan projection.

12. The inspection system of claim 1, wherein each source point of the first, second, third and fourth plurality of stationary source points are connected to a single high-voltage power supply in a daisy chain configuration.

13. The inspection system of claim 1, wherein the field of view of each source point of the first, second, third and fourth plurality of stationary source points ranges from 60 degrees to 120 degrees.

14. The inspection system of claim 1, wherein the field of view of each source point of the first, second, third and fourth plurality of stationary source points is non-uniform across a length of the first, second, third, or fourth linear X-ray source module.

15. An inspection system to scan an object, comprising:
a conveyor to transport the object through a scanning volume for inspection;
a multi-focus X-ray source comprising a plurality of X-ray source points sparsely arranged in one or more linear source modules around the scanning volume, wherein a beam angle of X-rays formed by each of the plurality of X-ray source points relative to the object for inspection varies across the plurality of X-ray source points;
a detector array positioned between the multi-focus X-ray source and the scanning volume, wherein the detector array comprises a plurality of detector modules arranged in a non-circular geometry around the scanning volume to detect X-rays transmitted through the object during scanning and is configured to generate scan data, and wherein a first plane of the X-ray source and a second plane of the detector array are offset with respect to one another in a direction substantially parallel to a direction of movement of the object; and
a processor configured to analyze the scan data and reconstruct image data of the object being inspected.

16. The inspection system of claim 15, wherein the plurality of X-ray source points are arranged in four linear source modules forming a rectangular geometry around the scanning volume.

17. The inspection system of claim 15, wherein the plurality of X-ray source points are arranged in three linear source modules forming a U geometry around the scanning volume.

18. An inspection system to scan an object, comprising:
a conveyor to transport the object through a scanning volume for inspection;
a plurality of X-ray source points arranged in:
a first X-ray source assembly comprising two linear X-ray source modules positioned on first and second adjacent sides of the scanning volume to form a substantially right angle between the two source modules, wherein the two linear X-ray source modules comprise a first plurality and a second plurality of stationary source points respectively, configured to emit X-rays and serially positioned along a length of the linear X-ray source module; and
a second X-ray source assembly comprising two linear X-ray source modules positioned on first and fourth adjacent sides of the scanning volume to form a substantially right angle between the two source modules, wherein the two linear X-ray source modules comprise a third plurality and fourth plurality of stationary source points respectively, configured to emit X-rays and serially positioned along a length of the linear X-ray source module;
a detector array having:
a first detector assembly of two detector modules positioned on third and fourth adjacent sides of the scanning volume to form a substantially right angle between the two detector modules, such that the form of the first detector assembly inversely corresponds to the form of the first source assembly, and wherein said first source assembly and said first detector assembly lie on a first plane;
a second detector assembly of two detector modules positioned on second and third adjacent sides of the scanning volume to form a substantially right angle between the two detector modules, such that the form of the second detector assembly inversely corresponds to the form of the second source assembly, and wherein said second source assembly and said second detector assembly lie on a second plane, and wherein said first plane is offset from said second plane in a direction of conveyance of the object;
a controller configured to activate and deactivate each of the source points of the first, second, third, and fourth plurality of stationary source points in a predefined sequence; and
a processor for processing the scan data to reconstruct three dimensional images of the object.

* * * * *